United States Patent
Helou et al.

(10) Patent No.: US 9,493,606 B2
(45) Date of Patent: Nov. 15, 2016

(54) ONE-STEP, ONE-POT PROCESS FOR PREPARING MULTIBLOCK AND GRADIENT COPOLYMER

(75) Inventors: Marion Helou, Ixelles (BE); Sophie Guillaume, Vitré (FR); Jean-François Carpentier, Acigné (FR); Martine Slawinski, Nivelles (BE); William Guerin, Rennes (FR)

(73) Assignees: Total Research & Technology Feluy, Seneffe (Feluy) (BE); Centre National de la Recherche Scientifique (CNRS), Paris (FR)

( * ) Notice: Subject to any disclaimer, the term of this patent is extended or adjusted under 35 U.S.C. 154(b) by 154 days.

(21) Appl. No.: 13/825,513

(22) PCT Filed: Sep. 2, 2011

(86) PCT No.: PCT/EP2011/065226
§ 371 (c)(1),
(2), (4) Date: Apr. 26, 2013

(87) PCT Pub. No.: WO2012/038240
PCT Pub. Date: Mar. 29, 2012

(65) Prior Publication Data
US 2014/0148558 A1    May 29, 2014

(30) Foreign Application Priority Data
Sep. 21, 2010 (EP) .................................. 10290502

(51) Int. Cl.
| | | |
|---|---|---|
| C08G 63/08 | (2006.01) | |
| C08G 63/64 | (2006.01) | |
| C08G 63/87 | (2006.01) | |
| C08G 64/02 | (2006.01) | |
| C08G 64/18 | (2006.01) | |
| C08G 64/30 | (2006.01) | |
| C08G 63/83 | (2006.01) | |
| C08G 63/84 | (2006.01) | |

(52) U.S. Cl.
CPC ............... *C08G 63/87* (2013.01); *C08G 63/08* (2013.01); *C08G 63/64* (2013.01); *C08G 63/83* (2013.01); *C08G 63/84* (2013.01); *C08G 64/0208* (2013.01); *C08G 64/18* (2013.01); *C08G 64/30* (2013.01)

(58) Field of Classification Search
None
See application file for complete search history.

(56) References Cited

U.S. PATENT DOCUMENTS

| | | | | |
|---|---|---|---|---|
| 5,610,266 A | * | 3/1997 | Buchholz | A61K 47/34 528/354 |
| 5,834,567 A | * | 11/1998 | Yasuda | 525/411 |
| 6,083,524 A | * | 7/2000 | Sawhney et al. | 424/426 |
| 6,498,229 B1 | | 12/2002 | Shalaby | |
| 2010/0305281 A1 | * | 12/2010 | Fujiwara et al. | 525/461 |
| 2011/0144296 A1 | * | 6/2011 | Li et al. | 528/27 |
| 2012/0136124 A1 | | 5/2012 | Carpentier et al. | |

FOREIGN PATENT DOCUMENTS

| | | | |
|---|---|---|---|
| EP | 2196486 | * | 6/2010 |
| WO | WO-2009106459 | * | 9/2009 |
| WO | WO-2009106460 | * | 9/2009 |
| WO | WO-2010022684 | * | 1/2010 |
| WO | WO-2010/012562 | * | 2/2010 |
| WO | 2011/023450 A1 | | 3/2011 |

OTHER PUBLICATIONS

Piotr Dobrzynski et al: "Synthesis of biodegradable copolymers with low-toxicity zirconium compounds. V. Multiblock and random copolymers ofL-lactide with trimethylene carbonate obtained in copolymerizations initiated with zironium(IV) acetylacetonate", Journal of Polymer Science Part A: Polymer Chemistry, vol. 44, No. 10, May 15, 2006, p. 3184-3201.
Storey, R. et al; "Methacrylate-Encapped Poly(D,L-Lactide-Co-Trimethylene Carbonate) Oligomers. Network Formation by Thermal Free-Radical Curing"; Polymer; vol. 38; 1997; pp. 6295-6301.
Kricheldorf, H. et al; "Star-Shaped Homo- and Copolyesters Derived from e-Caprolactone, L,L-Lactide and Trimethylene Carbonate"; Macromolecular Chemistry and Physics; vol. 205; 2004; pp. 1602-1610.
Pego, A. et al; "Physical Properties of High Molecular Weight 1,3-Trimethylene Carbonate and D,L-Lactide Copolymers"; Journal of Materials Science; vol. 14; 2003; pp. 767-773.
Pego, A. et al; "Biodegradable Elastomeric Scaffolds for Soft Tissue Engineering"; Journal of Controlled Release; vol. 87; 2003; pp. 69-79.
Pego, A. et al; "In Vivo Behavior of Poly(1,3-Trimethylone Carbonate) and Copolymers of 1,3-Trimethylene Carbonate with D,L-Lactide or e-Caprolactone: Degradation and Tissue Response"; Journal of Biomedical Materials Resources; vol. 67A; 2003; pp. 1044-1054.
Pego, A. et al; "In Vitro Degradation of Trimethylene Carbonate Based (Co)polymers"; Macromolecular Bioscience; vol. 2; 2002; pp. 411-419.
Kricheldorf, H. et al; "A-B-A Triblock Copolyesters and Random Copolyesters of Trimethylene Carbonate and Various Lactones Via Macrocyclic Polymerization"; Macromolecular Chemistry and Physics; vol. 200; 1999; pp. 1726-1733.
Simic, V. et al; "Synthesis and Characterization of Some Block Copolymers and Lactides with Cyclic Monomers Using Yttrium Alkoxide as Initiator"; Macromolecular Symposia; vol. 153; 2000; pp. 109-121.

(Continued)

Primary Examiner — David Buttner
(74) Attorney, Agent, or Firm — Albert Shung

(57) ABSTRACT

The present invention relates to the field of tailored di-, tri- and multi-block as well as gradient polyesters/polycarbonates copolymers prepared by introducing monomers simultaneously in the reaction medium in the presence of an organometallic, metal salt or organic catalyst.

19 Claims, 15 Drawing Sheets

(56) References Cited

OTHER PUBLICATIONS

Tsutsumi, C. et al; "Biodegradations of Statistical Copolymers Composed of D,L-Lactide and Cyclic Carbonates"; Polymer International; vol. 52; 2003; pp. 439-447.

Agarwal, S. et al; "Sythesis and Microstructural Characterisation of Copolymers of L-Lactide and Trimethylene Carbonate Prepared Using the SmI2/Sm Initiator System"; Polymer International; vol. 54; 2005; pp. 1422-1428.

Hua, J. et al; "Influence of Chain Microstructure on the Hydrolytic Degradation of Copolymers from 1,3-Trimethylene Carbonate and L-Lactide"; Journal of Polymer Science; vol. 47; 2009; pp. 3869-3879.

Lemmouchi, Y. et al; "A Novel and Versatile Potassium-Based Catalyst for the Ring Opening Polymerization of Cyclic Esters"; Journal of Polymer Science; vol. 46; 2008; pp. 5348-5362.

Darensbourg, D. et al; "Ring-Opening Polymerization of Cyclic Monomers by Complexes Derived from Biocompatible Metals, Production of Poly(Lactide), Poly(Trimethylene Carbonate), and Their Copolymers"; Macromolecules; vol. 41; 2008; pp. 3493-3502.

Yang, J. et al; "Hydrolytic and Enzymatic Degradation of Poly(Trimethylene Carbonate-Co-D,L-Lactide) Random Copolymers with Shape Memory Behavior"; European Polymer Journal; vol. 46; 2010; pp. 783-791.

Kelen, T. et al; "Analysis of the Linear Methods for Determining Copolymerization Reactivity Ratios: A New Improved Linear Method"; Journal of Macromolecular Science Chemistry; vol. A9(1); 1975; pp. 1-27.

Zambelli, A. et al; "Syndiotactic Styrene-Butadiene Block Copolymers Synthesized with CpTiX3/MAO (Cp=C5H5, X=Cl, F; Cp=C5Me5, X=Me) and TiXn/MAO (n=3, X=acac; n=4, X=O-tert-Bu)"; Macromolecular Chemistry and Physics; vol. 201; 2000; pp. 393-400.

Chamberlain, B. et al; "Polymerization of Lactide with Zinc and Magnesium β-Diiminate Complexes: Stereocontrol and Mechanism"; Journal of American Chemical Society; vol. 123; 2001; pp. 3229-3238.

Zhang, L. et al; "Organocatalytic Stereoselective Ring-Opening Polymerization of Lactide with Dimeric Phosphazene Bases"; Journal of American Chemical Society; vol. 129; 2007; pp. 12610-12611.

Zhang, L. et al; "Phosphazene Bases: A New Category of Organocatalysts for the Living Ring-Opening Polymerization of Cyclic Esters"; Macromolecules; vol. 40; 2007; pp. 4154-4158.

Nederberg, F. et al; "Organocatalytic Ring Opening Polymerization of Trimethylene Carbonate"; Biomacromolecules; vol. 8; 2007; pp. 153-160.

Mindemark, J. et al; "End-Group-Catalyzed Ring-Opening Polymerization of Trimethylene Carbonate"; Macromolecules; vol. 40; 2007; pp. 3515-3517.

Office Action issued in European Application No. 11749457.5-1306 mailed Aug. 6, 2014 (4 pages).

\* cited by examiner

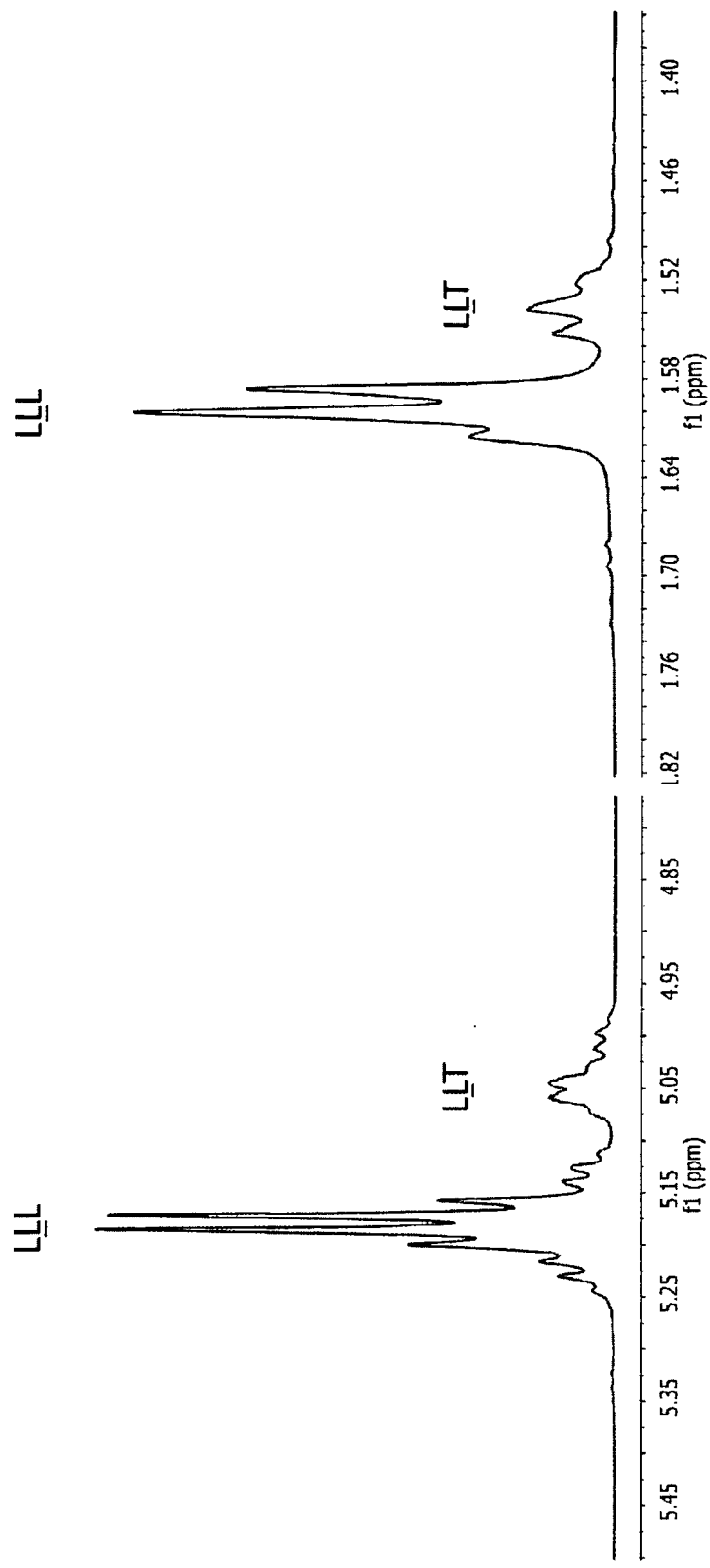
FIGURE 3bis

ONE-STEP, ONE-POT PROCESS FOR PREPARING MULTIBLOCK AND GRADIENT COPOLYMER

CROSS-REFERENCE TO RELATED APPLICATIONS

This application claims the benefit of PCT/EP2011/065226, filed Sep. 02, 2011, which claims priority from EP 10290502.3, filed Sep. 21, 2010.

FIELD OF THE INVENTION

The present invention relates to the field of tailored di-, tri- and multi-block as well as gradient polyesters/polycarbonates copolymers prepared by introducing monomers simultaneously in the reaction medium in the presence of an organometallic, metal salt or organic catalyst.

polycarbonate-polyesters that combine a soft poly(trimethylene carbonate) block (PTMC) and a hard, crystallisable poly(L- or D-lactide) block (PLLA, PDLA), thus forming so-called thermoplastic elastomers, are biodegradable and biocompatible and thus find applications as biomaterials.

Simultaneous copolymerisations of LA and TMC reported in the open literature include various catalytic systems leading to PLA/PTMC copolymers of various microstructures.

The most commonly used catalyst is tin(II) octanoate, $Sn(oct)_2$, operating most commonly in bulk at relatively high temperatures (100 to 180° C.). For instance in Storey et al. [Storey, R. F.; Warren, S. C.; Allison, C. J.; Puckett, A. D. *Polymer* 1997, 38, 6295-6301], $Sn(oct)_2$ was used in presence of a triol as co-initiator, namely 2-ethyl-2-(hydroxymethyl)propane-1,3-diol $(CH_3CH_2C(CH_2OH)_3$, (Scheme 1) offering star block copolymers $PLA\text{-}(PTMC)_3$.

Scheme 1

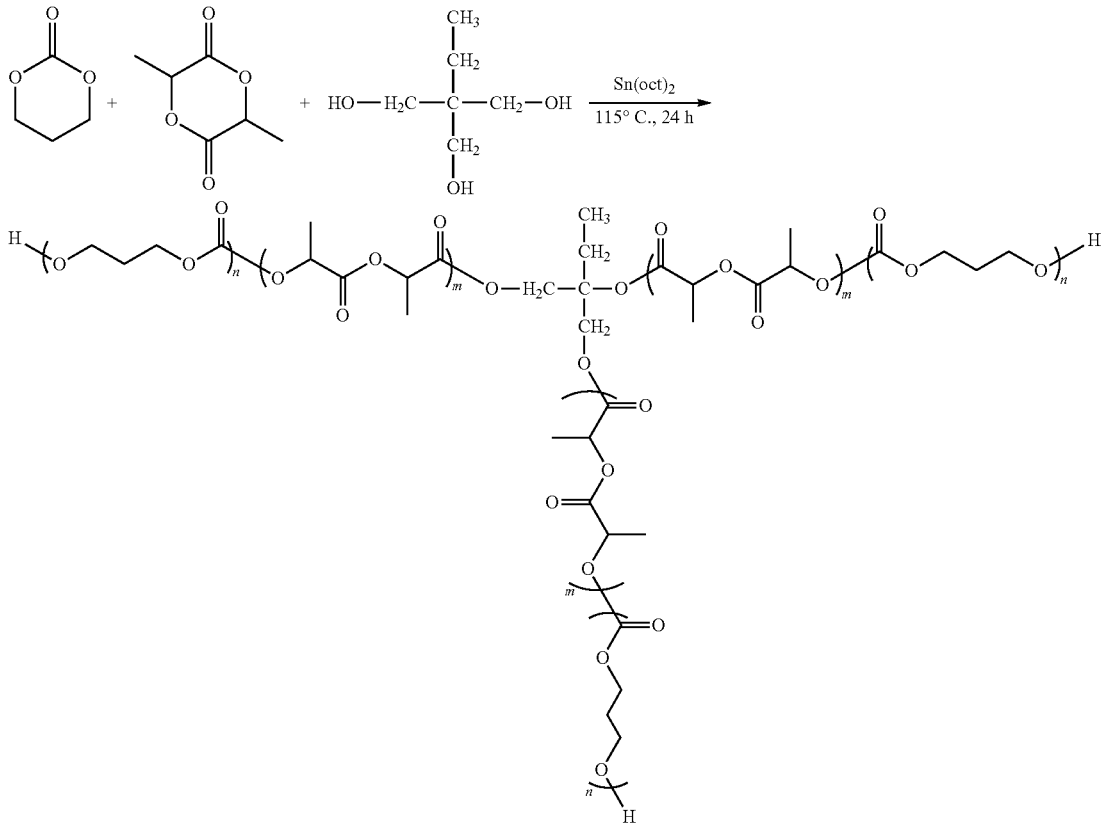

BRIEF DESCRIPTION OF THE RELATED ART

There is an obvious need for polymer materials based on renewable resources and efficient processes for preparing them. Of particular interest are block copolymers which allow, upon adjusting the size and nature of each block, tuning of the physical properties to obtain very specific physical properties, for instance phase separation of blocks. As an example, diblock and triblock Block copolymers of various architectures were prepared upon simultaneous addition of TMC and LA in chlorobenzene at 100° C. using various co-initiators such as a diol, triol or tetraol, as described by Kricheldorf in (Kricheldorf, H. R.; Ahrensdorf, K.; Rost, S. *Macromol. Chem. Phys.* 2004, 205, 1602-1610]. Kinetic investigations showed that LA was consumed first, after which TMC was then polymerised. The raise in temperature during the copolymerisation favours transesterification reactions and lowers the difference in reactivity of the two monomers, thus allowing the preparation of more statistical-like copolymers.

Similar copolymers prepared from the simultaneous copolymerisation of LA and TMC using Sn(oct)$_2$ at 130° C. has been reported by Feijen in [Pêgo, A. P.; Poot, A. A.; Grijpma, D. W.; Feijen, J. *J. Mater. Sci.: Mater. Med.* 2003, 14, 767-773. Pêgo, A. P.; Poot, A. A.; Grijpma, D. W.; Feijen, J. *J. Control. Release* 2003, 87, 69-79. Pêgo, A. P.; Van Luyn, M. J. A.; Brouwer, L. A.; Van Wachem, P. B., Poot, A. A.; Grijpma, D. W.; Feijen, J. *J. Biomed. Mater. Res.* 2003, 67A, 1044-1054. Pêgo, A. P.; Poot, A. A.; Grijpma, D. W.; Feijen, J. *Macromol. Biosci.* 2002, 2, 411-419.] However, the exact nature of the initiator and details of the microstructure of the final copolymers (especially no NMR data) are not mentioned; only degradation studies are discussed.

Formation of a stable tin metallacyle,

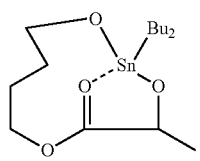

formed from the reaction of a dibutyltin(IV) precursor and lactide for the simultaneous copolymerisation of TMC and L-LA as reported in [Kricheldorf, H. R.; Stricker, A. *Macromol. Chem. Phys.* 1999, 200, 1726-1733] does not allow the preparation of either a block or a statistical copolymer but rather of a homopolylactide. In depth investigations showed that when TMC is introduced first, a block copolymer PTMC-b-PLLA is obtained whereas the introduction of L-LA first results in the formation of only a PLLA with unreacted TMC. It was assumed that the postulated cyclic tin complex thus prevented further coordination of cyclic carbonate monomer.

Initiating systems based on other metals than tin have been reported for the simultaneous copolymerisation of LA and TMC, such as the yttrium compound <<Y(OC$_2$H$_4$OMe)$_3$>> as reported in Simic et al. [Simic, V.; Pensec, S.; Spassky, N. *Macromol. Symp.* 2000, 153, 109-121]. The reaction performed in dichloromethane at room temperature led to the synthesis of block copolymers with lactide being polymerised first and TMC being only copolymerised once all lactide was consumed, as demonstrated by kinetics studies.

From two distinct samarium catalysts as described in Yasuda et al. [Tsutsumi, C.; Nakagawa, K.; Shirahama, H.; Yasuda, H. *Polym. Int.* 2003, 52, 439-447] and in Greiner [Agarwal, S.; Puchner, M.; Greiner, A.; Wendorff, J. H. *Polym. Int.* 2005, 54, 1422-1428], TMC/LA copolymerisation gave the corresponding copolymers with a different microstructure and thereby different properties. TMC/LA copolymerisation from trivalent MeSm(C$_5$Me$_5$)$_2$(THF) in toluene at 80° C., led to statistical copolymers as showed by Yasuda. On the other hand, divalent SmI$_2$ gave block copolymers upon simultaneous addition of both monomers as described by Greiner.

Kasperczyk and Dobrzynski [Dobrzynski, P.; Kasperczyk, J. *J. Polym Sci. A: Polym. Chem.* 2006, 44, 3184-3201. Hua, J.; Gebarowska, K.; Dobrzynski, P.; Kasperczyk, J.; Wei, J.; Li, S. *J. Polym Sci. A: Polym. Chem.* 2009, 47, 3869-3879. used the zirconium compound Zr(acac)$_4$ for the simultaneous copolymerisation of LA and TMC at 110-180° C. Different structures were observed for the copolymers depending on the temperature: block copolymers were formed at 110° C., whereas at 180° C. statistical copolymers were obtained, likely as a result of increasing transesterification reactions. Detailed microstructures of the copolymers were investigated from $^{13}$C NMR analyses and the reactivity ratio of each monomer was determined. Both block and statistical copolymers were thus identified.

More recently, efforts have been devoted to the synthesis of TMC/L-LA copolymers from more biofriendly metals as described in [Lemmouchi, Y.; Perry, M. C.; Amass, A. J.; Chakraborty, K.; Schacht, E. *J. Polym Sci. Part A: Polym. Chem.* 2008, 46, 5348-5362]. The potassium compound K[N(SiMe$_3$)$_2$] combined with poly(ethylene glycol) as co-initiator was very efficient at room temperature for the copolymerisation of TMC and L-LA. Simultaneous copolymerisation of TMC and L-LA, monitored by $^1$H and $^{13}$C NMR analyses of the copolymers, revealed a blocky structure.

Darensbourg et al studied in [Darensbourg, D. J.; Choi, W.; Karroonnirun, 0.; Bhuvanesh, N. *Macromolecules*, 2008, 41, 3493-3502] the copolymerisation of TMC with L-LA using an amido calcium complex bearing a Schiff base ligand.

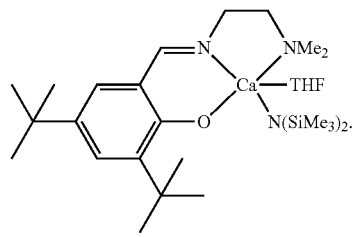

Kinetic and mechanical investigations underlined the blocky structure of the copolymers with lactide polymerised first, followed by TMC.

At last, Li et al. studied in [Yang, J.; Liu, F.; Yang, L.; Li, S. *Eur. Polym. J.* 2010, 46, 783-791] the simultaneous copolymerisation of TMC and D,L-LA using (Zn(OCOCH(OH)CH$_3$)$_2$) as catalyst in bulk at 140° C., in order to prepare shape memory copolymers. $^1$H and $^{13}$C NMR analyses combined with DSC results showed statistical (random) copolymers with high molar mass (around 100 000 g·mol$^{-1}$).

There is however room for improvement in those simultaneous copolymerisation of cyclic esters and cyclic carbonates. In particular, adjusting the nature of the catalytic system may lead to better controlled or, at the opposite, more diversified macromolecular compositions ranging from a perfect blocky structure to a statistical one, through gradient and random arrangements of the co-monomers. Also, the characterisation of the exact chemical structure of the copolymers along with determination of their physical (thermal, mechanical . . . ) properties need deeper investigations.

SUMMARY OF THE INVENTION

It is an objective of the present invention to provide a one-pot, one-step method for preparing di-, tri- or multi-block or gradient or statistical polyester/polycarbonate copolymers.

It is also an objective of the present invention to prepare fully biodegradable/bioassimilable di-, tri-, or multi-block linear, branched or star-shaped polyester/polycarbonate copolymers.

It is a further objective of the present invention to tailor di-, tri-, or multi-block copolymers with desired thermomechanical properties according to the catalytic system used in the ROP of the comonomers.

It is another objective of the present invention to provide di-, tri-, or multi-block or gradient copolymers with desired/tunable block length and with desired microstructure.

In accordance with the present invention, the foregoing objectives are realised as disclosed in the independent claims. Preferred embodiments are described in the dependent claims.

LIST OF FIGURES

Figure 3:
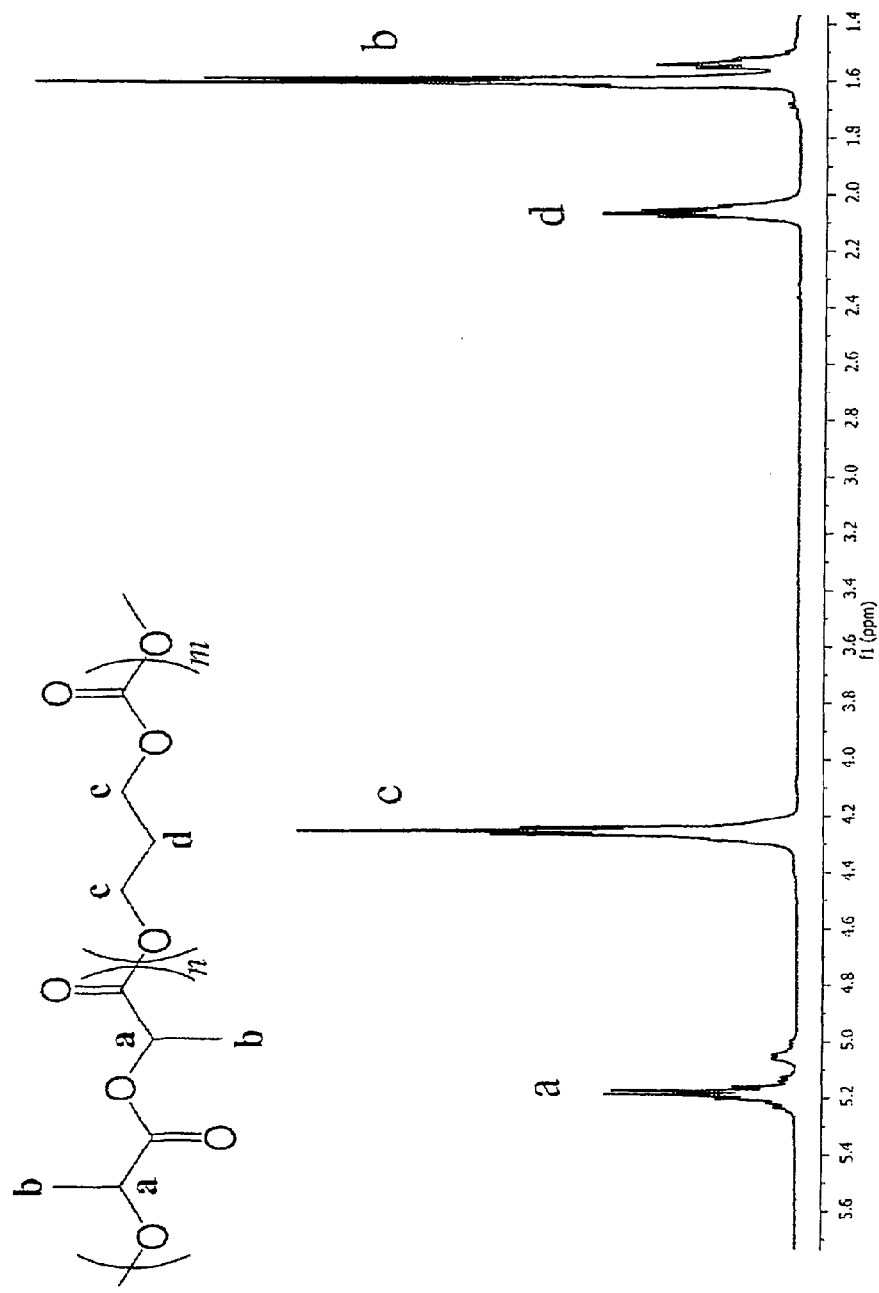
FIG. 3 represents the $^1$H NMR spectrum of a copolymer PTMC$_{52}$/PLLA$_{48}$ (Mn=15 200 g·mol$^{-1}$) prepared with the catalyst system [BDI]Zn(N(SiMe$_3$)$_2$)/BnOH.

FIG. 3b is represents 2 details of the $^1$H NMR spectrum from FIG. 3, respectively from 1.45 to 1.70 ppm and from 5.00 to 5.30 ppm.

Figure 4:
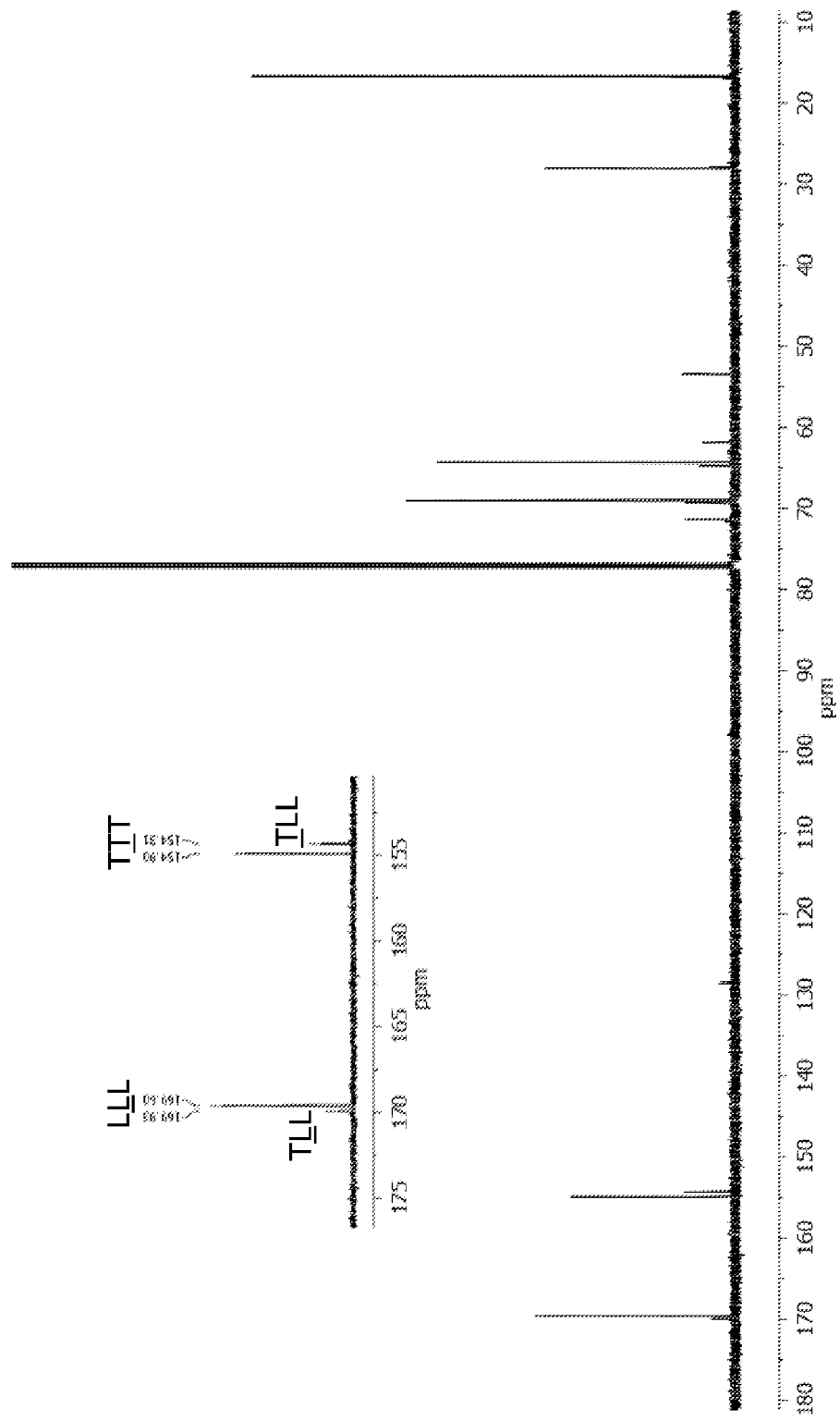

FIG. 4 represents the $^{13}$C NMR spectrum of a copolymer PTMC$_{52}$/PLLA$_{48}$ (Mn=15 200 g·mol$^{-1}$) prepared with the catalyst system [BDI]Zn(N(SiMe$_3$)$_2$)/BnOH.

Figure 5:
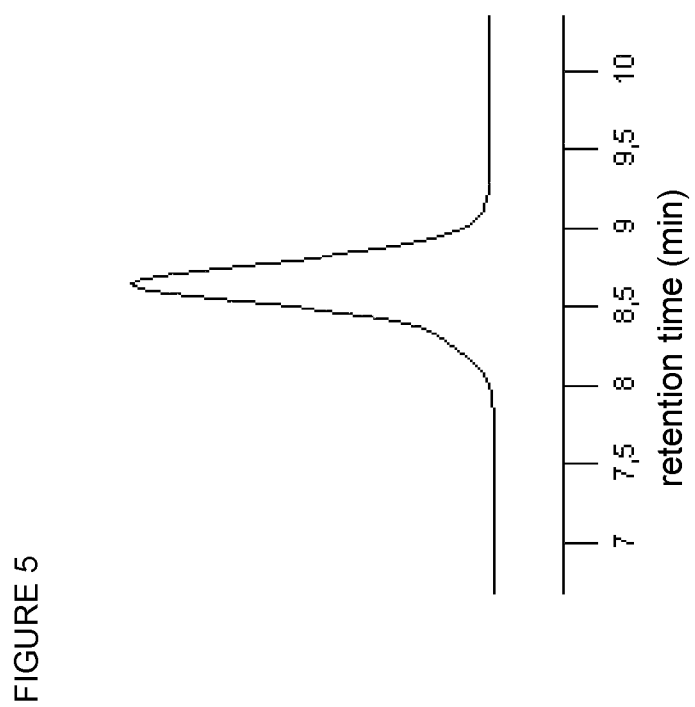

FIG. 5 represents the size exclusion chromatography (SEC) trace of a copolymer PTMC$_{52}$/PLLA$_{48}$ (Mn=15 200 g·mol$^{-1}$) prepared with the catalyst system [BDI]Zn(N(SiMe$_3$)$_2$)/BnOH.

Figure 6:
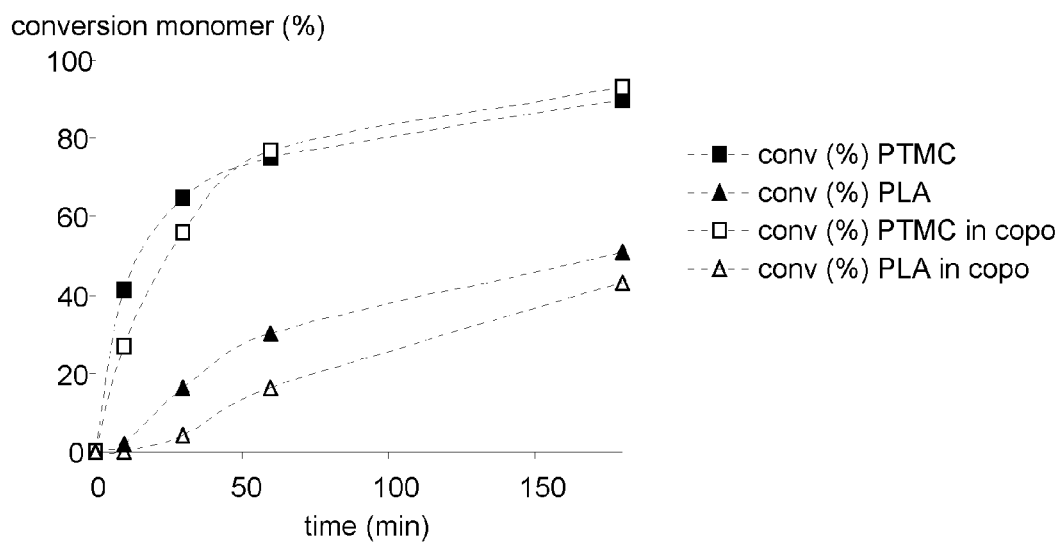

FIG. 6 represents the conversion of trimethylene carbonate (TMC) and lactide (L-LA) expressed in mol percent as a function of time expressed in minutes during their homo- and co-polymerisation in the presence of the Lewis acid type catalyst systems Bi(OTf)$_3$/BnOH and Al(OTf)$_3$/BnOH.

Figure 7:
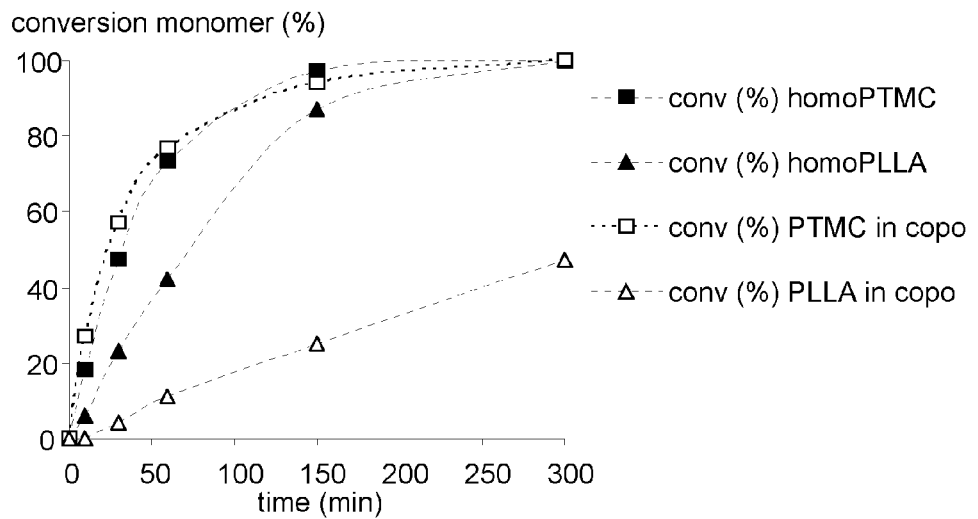

FIG. 7 represents the conversion of trimethylene carbonate (TMC) and lactide (L-LA) expressed in mol percent as a function of time expressed in minutes during their homo- and co-polymerisation in the presence of Lewis acid type catalyst systems.

Figure 8:
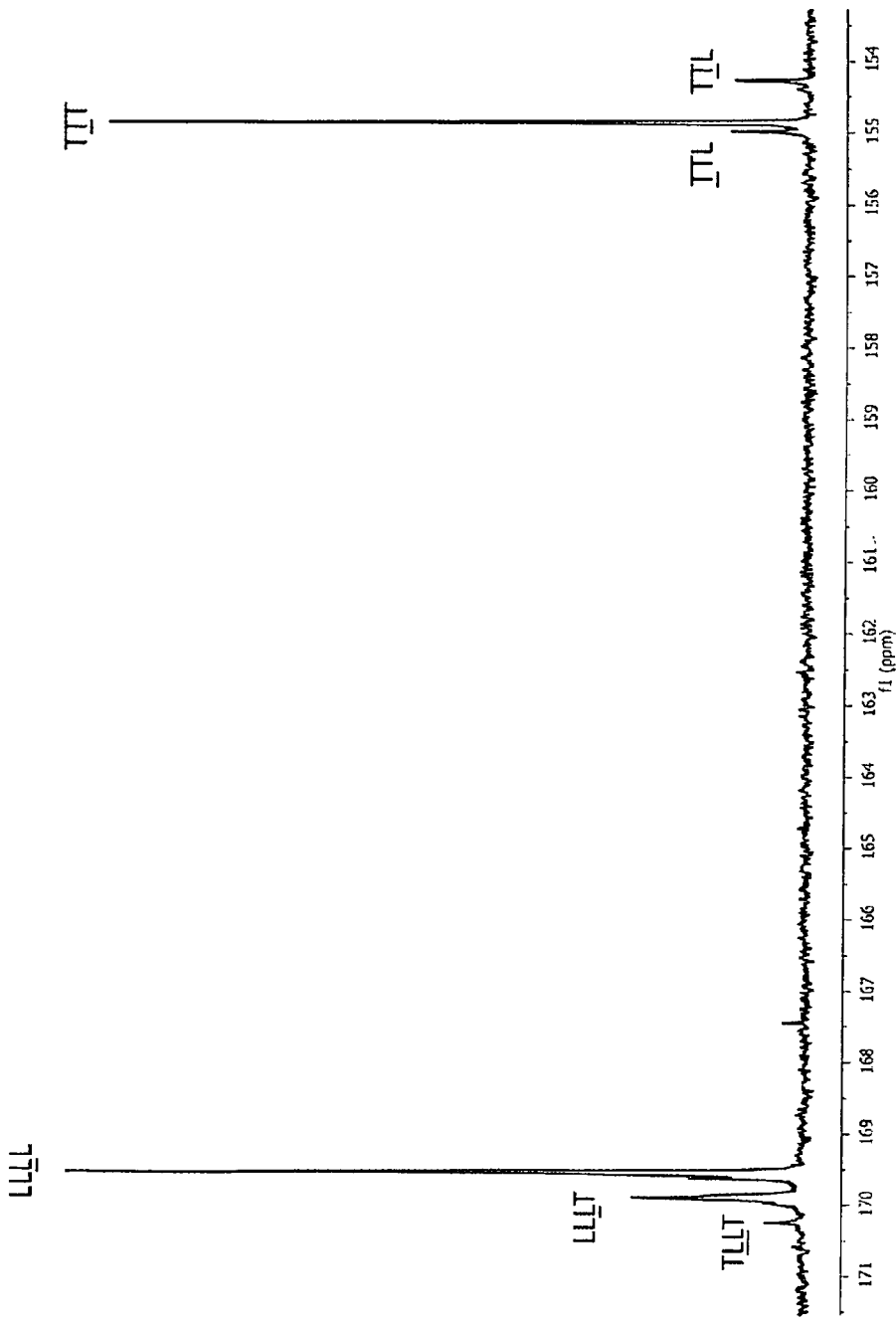

FIG. 8 represents the $^{13}$C NMR spectrum of a copolymer PTMC$_{50}$/PLLA$_{50}$ (Mn=9 000 g·mol$^{-1}$) prepared with the catalyst system Al(OTf)$_3$/BnOH.

Figure 9:
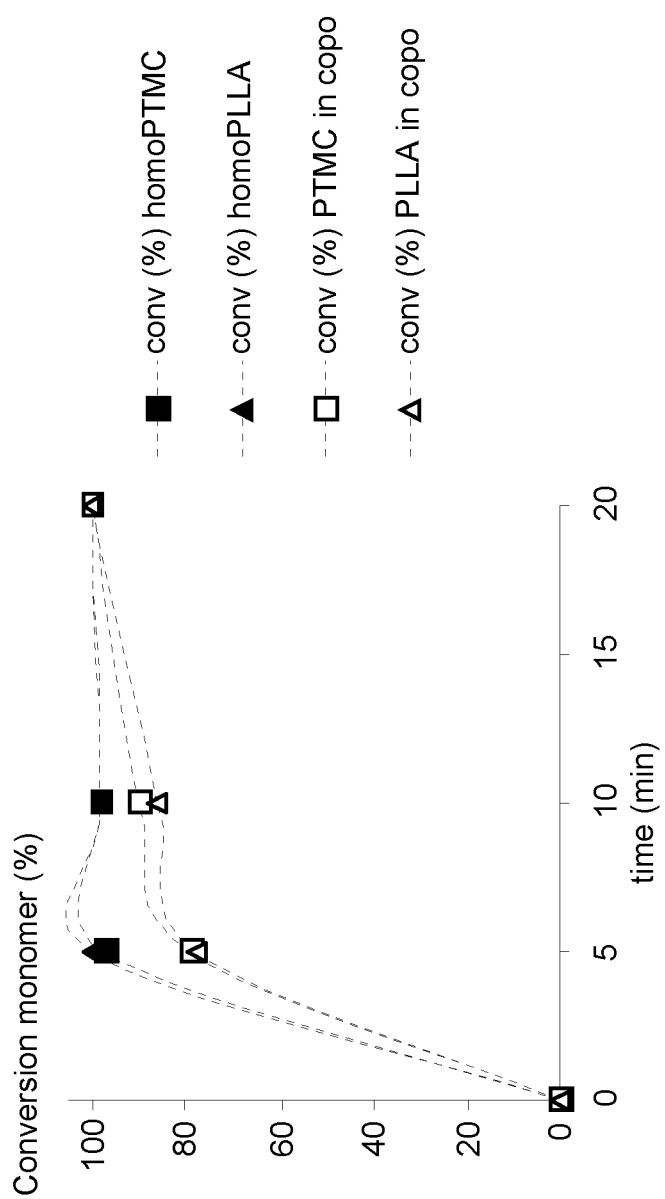

FIG. 9 represents the conversion of trimethylene carbonate (TMC) and lactide (L-LA) expressed in mol percent as a function of time expressed in minutes during their homo- and co-polymerisation in the presence of the organic catalyst system TBD/BnOH.

Figure 10:
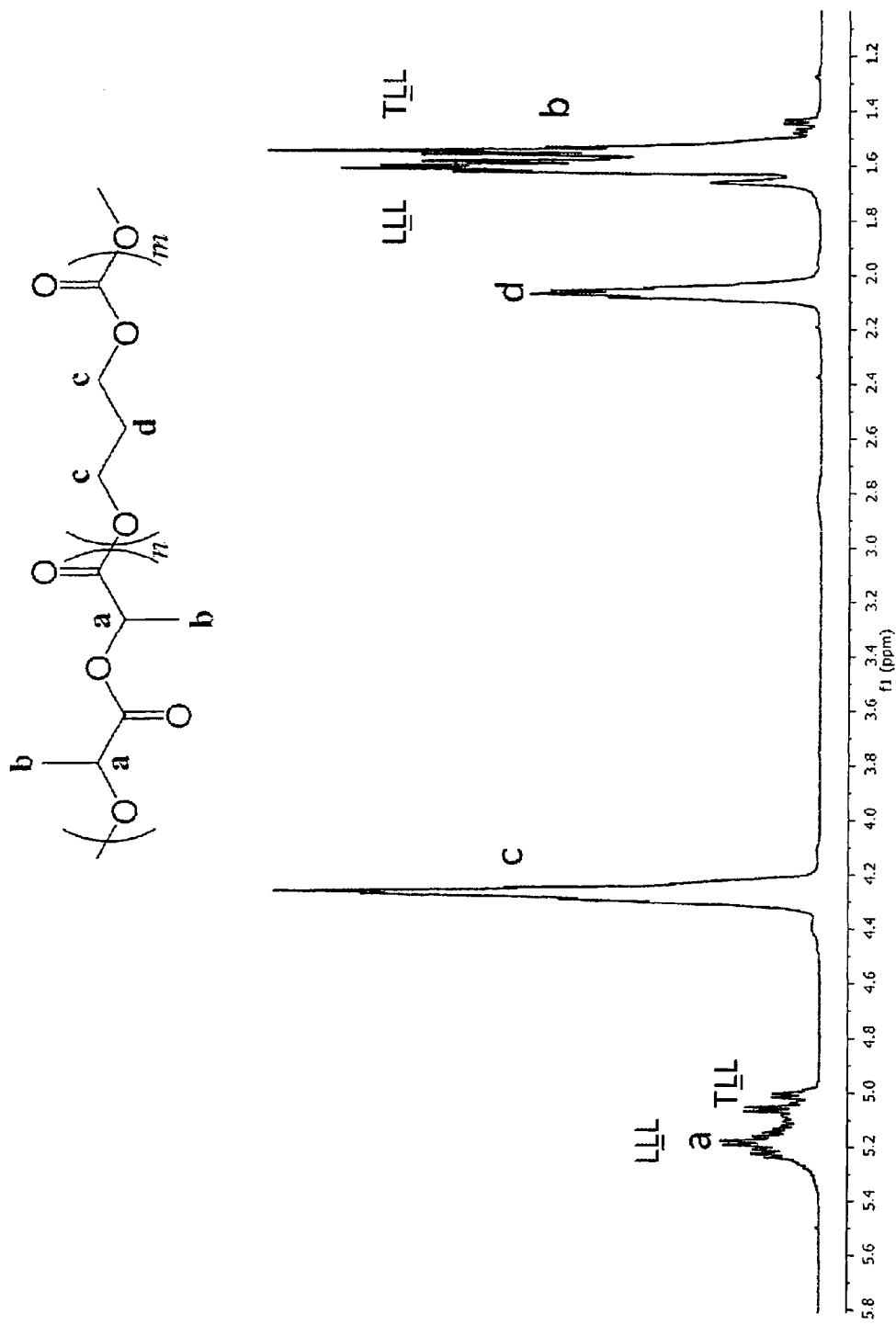

FIG. 10 represents the $^1$H NMR spectrum of a copolymer PTMC$_{51}$/PLLA$_{49}$ (Mn=10 940 g·mol$^{-1}$) prepared with the organic catalyst system TBD/BnOH.

Figure 11:
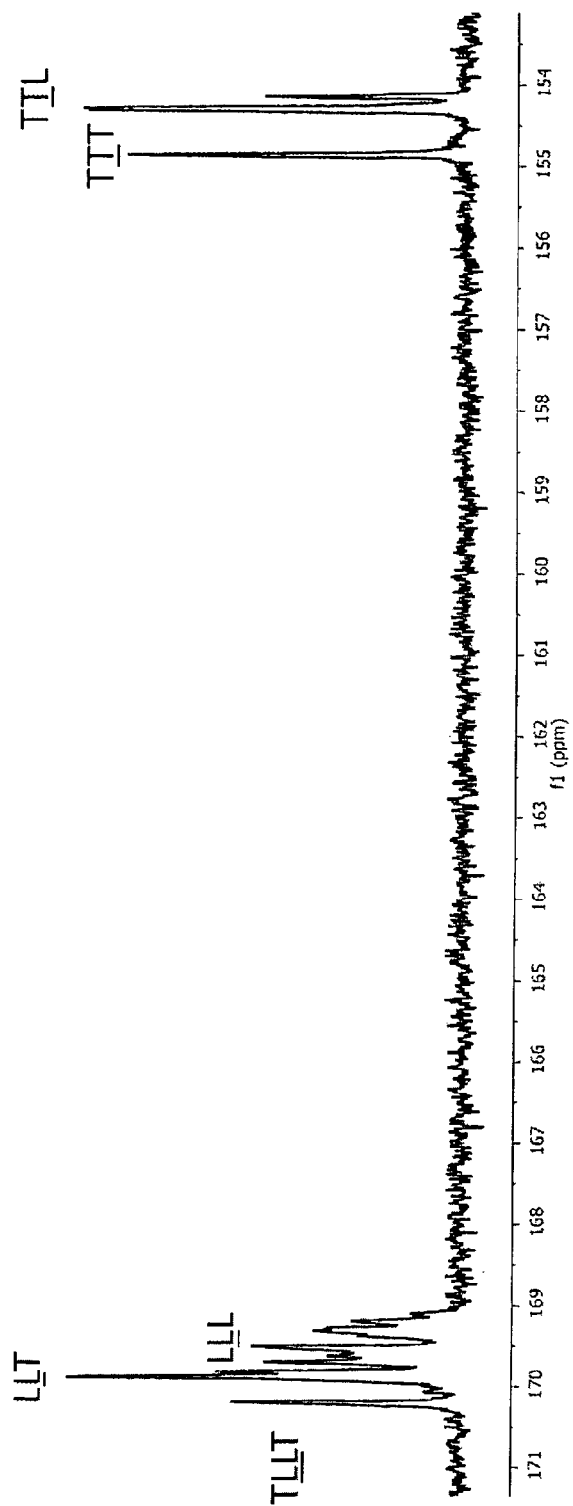

FIG. 11 represents the $^{13}$C NMR spectrum of a copolymer PTMC$_{51}$/PLLA$_{49}$ (Mn=12 000 g·mol$^{-1}$) prepared with the organic catalyst system TBD/BnOH.

Figure 12:
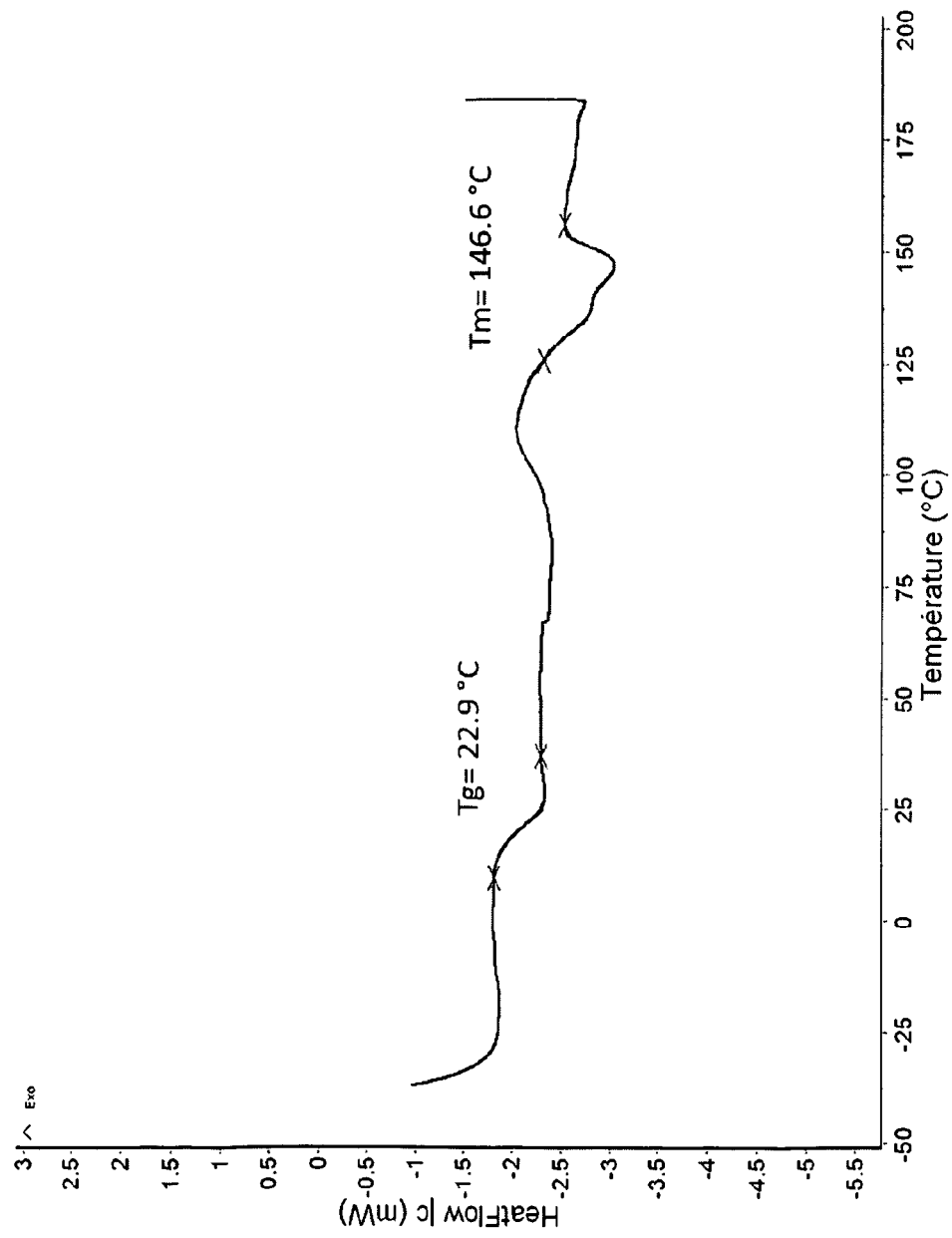

FIG. 12 represents the differential scanning calorimetry (DSC) trace of a copolymer PTMC/PLLA prepared with the organic catalyst system TBD/BnOH.

Figure 13:
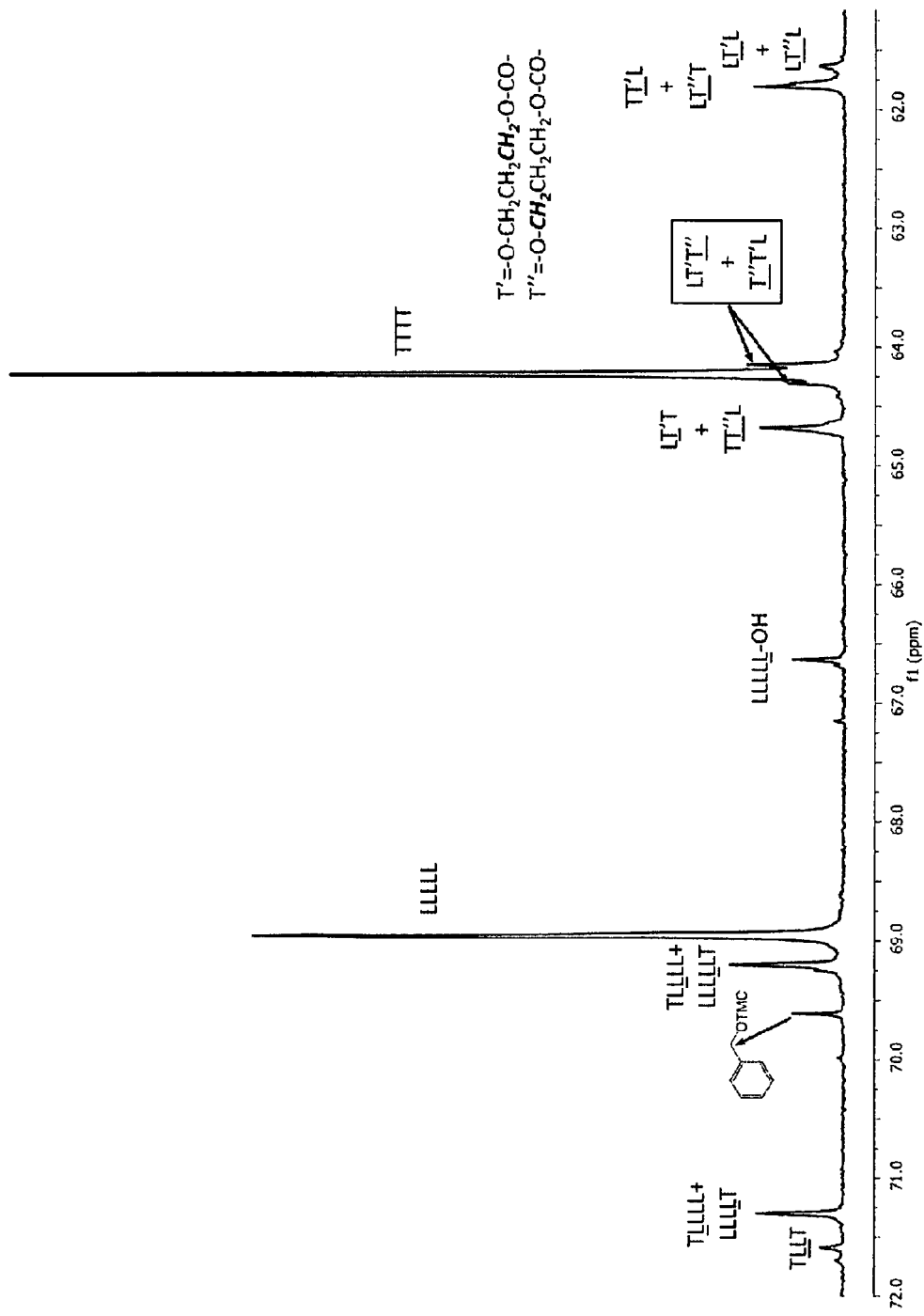

FIG. 13 represents the assignment and intensity of the $^{13}$C NMR signals (CDCl$_3$, 125 MHz, 23° C.) of a copolymer obtained by the simultaneous copolymerisation of TMC and L-LA with the catalyst system (BDI)Zn[N(SiMe$_3$)$_2$]/BnOH in toluene [2.0 M] at a temperature of 110° C.

Figure 14:
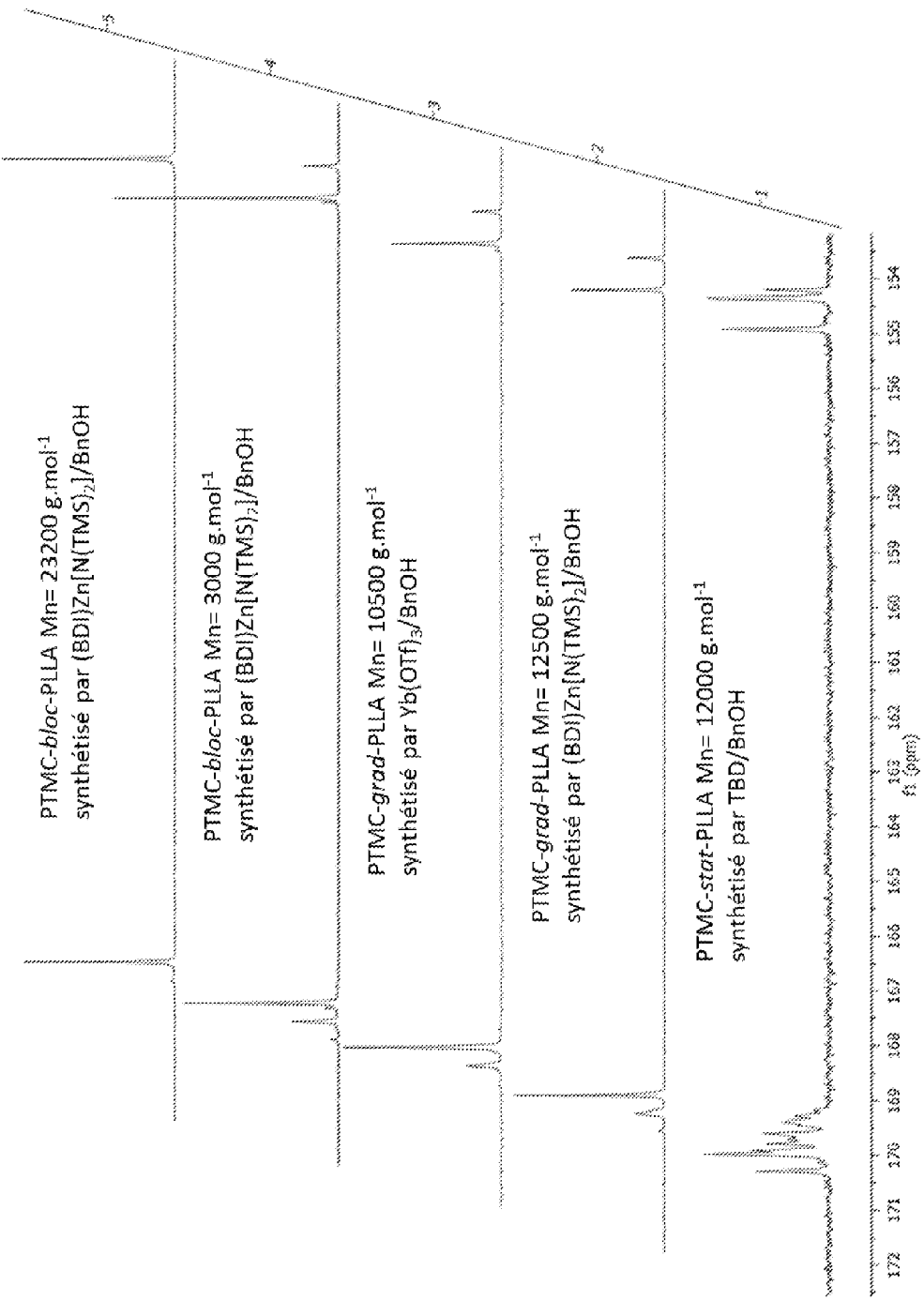

FIG. 14 represents the δ 150-175 ppm region of the $^{13}$C NMR spectrum (CDCl$_3$, 125 MHz, 23° C.), of copolymers obtained by the simultaneous copolymerisation of TMC and L-LA displayed in curves 1, 2 and 3 respectively, for the TDB/BnOH, (BDI)Zn[N(SiMe$_3$)$_2$]/BnOH and Yb(OTf)$_3$/BnOH systems and for the sequential copolymerisation of TMC and L-LA with the (BDI)Zn[N(SiMe$_3$)$_2$]/BnOH system displayed in curves 4 and 5 respectively for a number average molecular weight of 3000 and 23200 g/mol.

Figure 15:
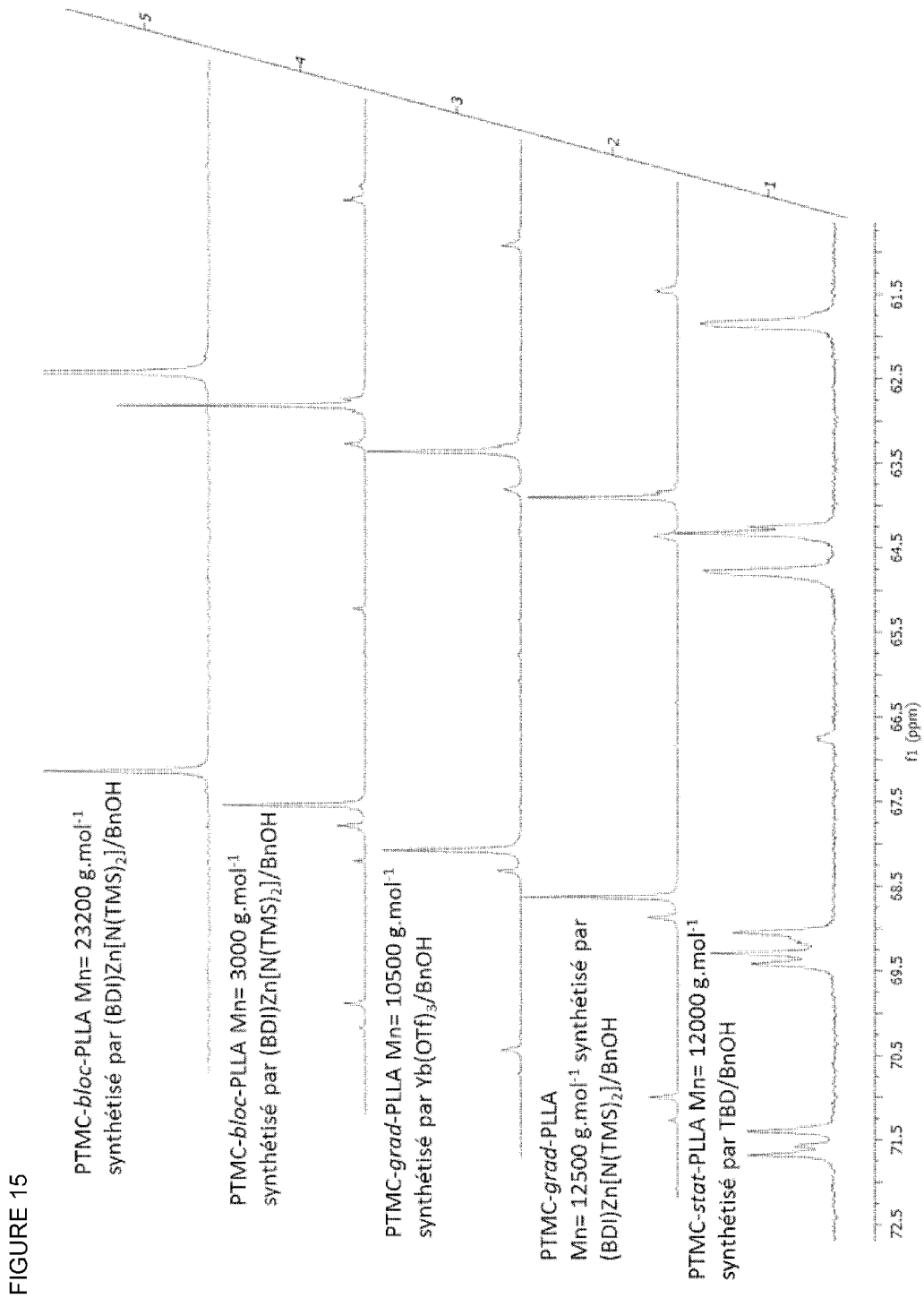

FIG. 15 represents the δ 60-75 ppm region of the $^{13}$C NMR spectrum (CDCl$_3$, 125 MHz, 23° C.), of copolymers obtained by the simultaneous copolymerisation of TMC and L-LA displayed in curves 1, 2 and 3 respectively for the TDB/BnOH, (BDI)Zn[N(SiMe$_3$)$_2$]/BnOH and Yb(OTf)$_3$/BnOH systems, and for the sequential copolymerisation of TMC and L-LA with the (BDI)Zn[N(SiMe$_3$)$_2$]/BnOH system displayed in curves 4 and 5 respectively for a number average molecular weight of 3000 and 23200 g/mol.

DETAILED DESCRIPTION

Accordingly, the present invention discloses a one-pot, one-step method for preparing block or gradient or statistical copolymers of ester/carbonate or carbonate1/carbonate2 in the presence of a catalyst selected from an organometallic catalyst, or a Lewis acidic metal salt or metal complex catalyst, or a metal free organic catalyst, or a combination thereof, and a protic source, typically an alcohol, used in excess, acting as initiator and transfer agent.

The microstructure of the resulting block copolymer depends strictly upon the nature of the catalyst component. Indeed, it is observed that the catalyst components of the present invention exhibit a different behaviour towards a monomer when placed in the presence of a comonomer than when the monomer is used alone.

In the present invention, the [phrase 'one-pot, one-step'] means that all comonomers, catalyst, initiator and transfer agent are placed simultaneously in the same reactor and that the copolymerisation is performed in a single step.

The present invention discloses a process for preparing di-, tri, or multi-block ester/carbonate or carbonate1/carbonate2 polymers by immortal ring-opening polymerisation that comprises the steps of:
a) providing simultaneously and in the same reactor:
   A) a catalyst system based on a compound selected from a Lewis acidic metal salt or a metal complex, or a metal-free organic base;
   B) an alcohol or a diol or a polyol in excess with respect to the catalyst;
   C) at least 2 different cyclic monomers of ester or carbonate selected, for instance, from 5-, 6-, or 7-membered cyclic carbonates such as for example,

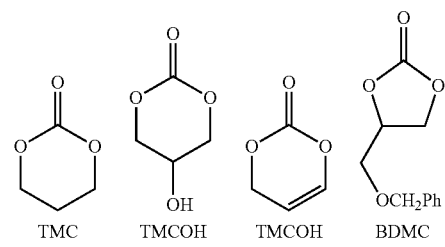

TMC    TMCOH    TMCOH    BDMC

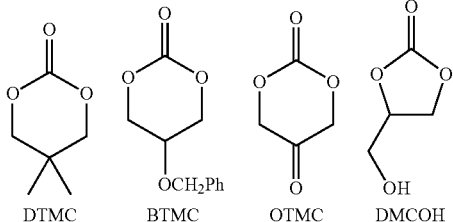

DTMC  BTMC  OTMC  DMCOH or lactide (LA), glycolide, rac-beta-butyrolactone (rac-BBL) or epsilon-caprolactone (CL), or any other lactone, diester, cyclic carbonate, morpholinediones, . . .

b) maintaining under polymerisation conditions at a temperature of from room temperature to 150° C. in bulk (melted monomer) or in a solvent;

c) retrieving a di- tri- or multi-block copolymers.

characterised in that the resulting copolymer has a microstructure that depends upon the type of catalyst system.

The catalyst systems are of three types: Lewis acidic metal salt or organometallic complex, or metal-free organic base. The microstructure of the block copolymers obtained in the present invention depends upon the reactivity of each monomer for each of these catalyst systems. Experiments aimed at determining the monomer reactivity ratios based on the Kelen-Tudos method (Kelen T. and Tudos F. In *J. Macromol. Sci. Chem. A*9(1), 1-27, 1975) or on the Zambelli method (Zambelli A., Caprio M., Grassi A., Bowen D. E., in *Macromol. Chem. Phys.*, 201, 393-400, 2000) failed to provide reliable values. This is likely due to the observed fact that the monomers behave very differently when used in homopolymerisation and in copolymerisation.

The reactivity ratios were thus obtained using both a kinetic approach to determine the rate of consumption, and NMR spectroscopic analyses to determine insertion of each monomer in the final copolymer, i.e. to determine the microstructure of the copolymer.

It is observed that the catalyst systems based on organometallic complexes usually consume the lactide monomers at a much faster rate than the cyclic carbonate monomers, therefore leading to a final copolymer of gradient type, composed of polylactide blocks separated by single-to-a few carbonate units, followed by a pure polycarbonate block formed after all lactide has been consumed.

The catalyst systems based on metal salts usually present the opposite behaviour and consume the carbonate monomers much faster than the lactide monomers also leading to a gradient type block copolymer. It is further observed that, even with the same reaction mechanism, the rate of consumption of monomers is influenced by the nature of the salt, thereby providing further means for fine-tuning the microstructure of the final copolymer.

The catalyst system based on the metal-free organic base TBD consumes both lactide and carbonate at the same rate, therefore leading to a statistical copolymer wherein the carbonate and lactide units are statistically distributed over the copolymer chain.

In the present invention, the blocks composing the block copolymers may thus be homopolymer blocks or copolymer blocks, characterised in that consecutive blocks have a different composition.

In this process, the alcohol plays two roles:

according to the type of catalyst used, it acts either as an external nucleophile for initiating polymerisation via ring-opening of a monomer activated for example with Lewis acid or organic base catalysts, or for transforming the pre-catalyst, for example a metal-amido or metal-alkyl complex, that has little or no activity, into an active metal-alkoxide species, via an alcoholysis process;

it also acts as a transfer agent, by generating multiple polymer chains. Excess alcohol acts as transfer agent, transferring reversibly propagating polyester/polycarbonate chains from the active metal center to dormant hydroxy-end capped polyester/polycarbonate chains. Accordingly, it is observed that the number average molecular weight increases when the monomer/alcohol ratio increases. The latter chain transfer process can be represented schematically as follows in the case of a cyclic carbonate monomer:

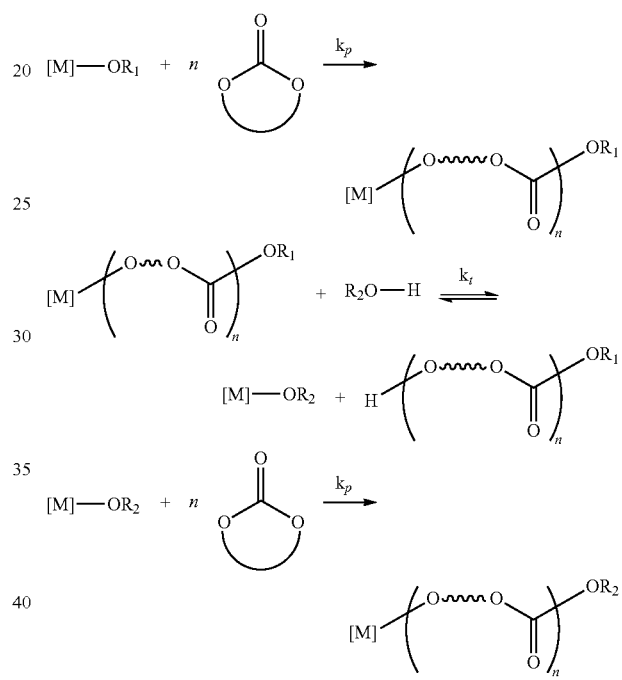

The metal complexes acting as catalyst systems can be selected from single-site catalyst components, for instance, based upon a bulky β-diiminate ligands (BDI) as described by Coates et al. (B. M. Chamberlain, M. Cheng, D. R. Moore, T. M. Ovitt, E. B. Lobkovsky, and G. W. Coates, in *J. Am. Chem. Soc.*, 2001, 123, 3229) and represented for Zn by the general formula:

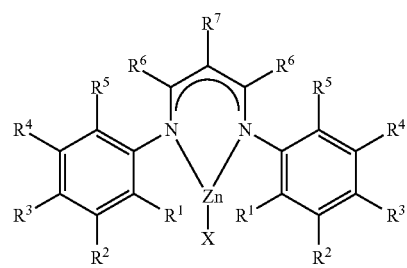

wherein $R^1$, $R^2$, $R^3$, $R^4$, $R^5$, $R^6$ and $R^7$ are each independently selected from hydrogen, unsubstituted or substituted hydrocarbyl, or inert functional group and wherein two or more of said groups can be linked together to form one or more rings, wherein X is an hydrocarbyl radical having from 1 to 12 carbon atoms, an alkoxide group OR*, an amido group NR**$_2$ or a borohydride group (BH$_4$).

In the present description, an inert functional group is defined as a group containing one or several heteroatoms selected from O, N, S or halogen, that is(are) not reactive in the polymerisation system neither as an initiating species nor as a chain transfer agent.

Among the preferred catalytic compounds of that category, one can further cite [BDI]Zn(N(SiMe$_3$)$_2$), {[BDI]Zn (OiPr)}$_2$, Zn(N(SiMe$_3$)$_2$), ZnEt$_2$, Ln(N(SiMe$_3$)$_2$)$_3$ (Ln= group III metals, including the lanthanide series), "Ln (OiPr)$_3$" and Ln(OCH$_2$CH$_2$OMe)$_3$, Al(OiPr)$_3$, Mg[N (SiMe$_3$)$_2$]$_2$, Ca[N(SiMe$_3$)$_2$]$_2$(THF)$_2$, (BDI)Fe[N(SiMe$_3$)$_2$], Fe[N(SiMe$_3$)$_2$]$_2$, and Fe[N(SiMe$_3$)$_2$]$_3$.

They act by a coordination/insertion mechanism.

The metallic salt can be selected from metallic complexes of formula M(OSO$_2$CF$_3$)$_n$, hereafter referred to as triflates or OTf or of formula M(N(OSO$_2$CF$_3$)$_2$)$_n$, hereafter referred to as triflimidates or NTf$_2$ or of formula M(RC(O)CR$_2$C(O)R)$_n$, hereafter referred to as acetylacetonates or acac or of formula (R"CO$_2$)$_n$M, hereafter referred to as carboxylates, wherein M is a metal Group 2, 3, including the lanthanide series, hereafter referred as Ln, 4, 12, 13, 14 or 15 of the periodic Table, wherein each R is selected independently from a linear or branched hydrocarbyl radical having from 1 to 12 carbon atoms, substituted or not by for instance an halogen or heteroatom, wherein each R" is selected independently from a perfluorinated alkyl or aryl residue having from 1 to 12 carbon atoms, and wherein n is the valence of M.

Preferably, M is Mg(II), Ca(II), Sc(III), Ln(III), Y(III), Sm(III), Yb(III), Ti(IV), Zr(IV), Fe(II), Fe(III), Zn(II), Al(III) Sn(IV) or Bi(III). More preferably, it is Al, Bi, Zn or Sc. Most preferably, it is Al which is the most efficient metal.

Preferably each R is selected independently from alkyl group such as CH$_3$ or a substituted alkyl group such as CF$_3$. More preferably, they are all the same and they are CH$_3$ or CF$_3$.

Preferably, R" is (C$_6$F$_5$) or (CF$_3$), or CF$_3$(CF$_2$)$_m$ wherein m is an integer ranging between 1 and 6.

Among the preferred catalytic compounds in this category, one can cite as non limitative examples Al(OTf)$_3$, Al(NTf$_2$)$_3$, Mg(OTf)$_2$, Ca(OTf)$_2$, Zn(OTf)$_2$, Sc(OTf)$_3$, Bi(OTf)$_3$, Al(hfacac)$_3$ (hfacac=1,1,1,5,5,5-hexafluoroacetylacetonate), Fe(acac)$_3$, Al(OCOCF$_3$)$_3$, Zn(OCOCF$_3$)$_2$, Zn(BF$_4$)$_2$, Zn(acac)$_2$, Zn(hfacac)$_2$, Zr(acac)$_4$.

These catalysts act by an activated monomer pathway, in combination with an external nucleophile, the alcohol compound.

The non-metallic organic compounds can be selected, as non limitative examples, from dimeric phosphazene bases as disclosed for example in Zhang et al. (Zhang L., Nederberg F., Messman J. M., Pratt R. C., Hedrick J. L., and Wade C. G., in *J. Am. Chem. Soc.*, 2007, 129, 12610-12611) or phosphazene bases as disclosed for example in Zhang et al. (Zhang L., Nederberg F., Pratt R. C., Waymouth R. M., Hedrick J. L., and Wade C. G., in *Macromolecules* 2007, 40, 4154-4158) or organic compounds such as amines or guanidine as described for example in Nederberg et al. (Nederberg F., Lohmeijer G. B., Leibfarth F., Pratt R. C., Choi J., Dove A. P., Waymouth R. M., Heidrich J. L., in *Biomacromolecules*, 8, 153, 2007) or in Mindemark et al. (Mindemark J., Hilborn J., Bowden T., in *Macromolecules*, 40, 3515, 2007).

The organocatalyst precursors are preferably selected from amine, guanidine (TBD, MTBD), amidine (DBU), tertiary amines (DMAE, DMAEB), some NHCs, bifunctional thiourea-tertiary amine catalysts or phosphazene (Scheme 2). They are used in the presence of an alcohol acting both as co-initiator and transfer agent.

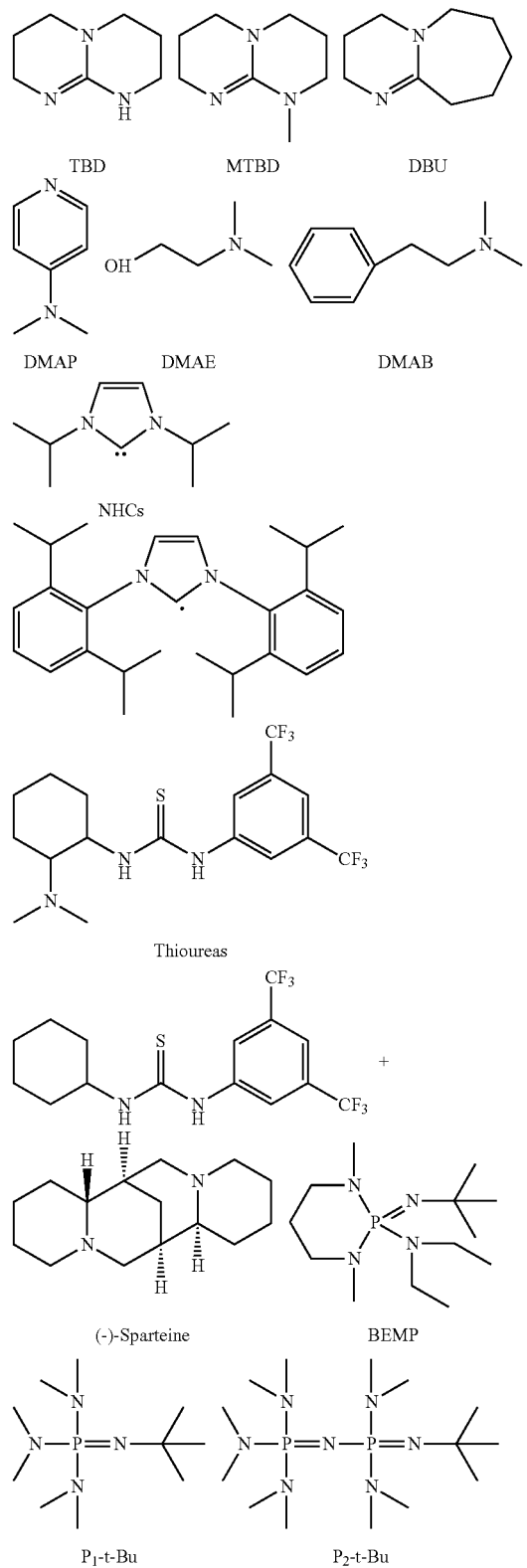

The preferred organocatalysts according to the present invention are selected from 4-dimethylaminopyridine (DMAP) or 1,5,7-triazobicyclo-[4,4,0]dec-5-ene (TBD) or tert-butylimino-1,3-dimethylperhydro-1,3,2-diazaphosphine (BEMP). More preferably, it is TBD.

The catalyst system based on organocatalysts operates via a so-called "activated monomer pathway".

In the current "activated monomer pathway", the alcohol plays two roles:
- as an external nucleophile for initiating the polymerisation via the ring-opening of the activated monomer; 1 equivalent of alcohol per organocatalyst is used in the process;
- as a transfer agent, by generating multiple polymer chains; all excess alcohol molecules are used in this second process, and the final molecular weight of the polymer is a function of the alcohol-to-monomer ratio.

The protic source is typically an alcohol, it can also be an amine selected for example from $BnNH_2$ or $nPrNH_2C_5H_{10}$.

The alcohol can be represented by formula R'OH wherein R' is an hydrocarbyl, linear or branched, having from 1 to 20 carbon atoms. Preferably R' is a secondary alkyl residue or benzylic group, more preferably it is isopropyl (iPr) or benzyl (Bn). It can also be a poly-ol (diol, triol and higher functionality polyhydridic alcohols), typically 1,3-propanediol or trimethylolpropane, possibly derived from biomass such as glycerol or any other sugar based alcohol (erythritol, cyclodextrine). All alcohols can be used individually or in combination.

The alcohol is used in excess with an alcohol to catalyst molar ratio of at least 5.

As will be seen in the examples, the blocks constituting the block copolymers may vary from pure homopolymer blocks to statistical copolymer blocks with the full spectrum of intermediate and gradient compositions, depending upon the catalyst component used.

The present invention thus offers the possibility to precisely tailor the blocks constituting the block copolymers or to produce a diblock-gradient structure.

EXAMPLES

Copolymerisation of Cyclic Carbonates and Lactides with Organometallic Complex

Example 1

The copolymerisation of TMC and L-LA was carried out in one-step, one-pot with the organometallic complex (BDI)Zn[N(SiMe₃)₂] in the presence of benzylic alcohol (BnOH), in toluene solution (2.0 M) and at temperatures ranging between 60 and 110° C. according to scheme 4

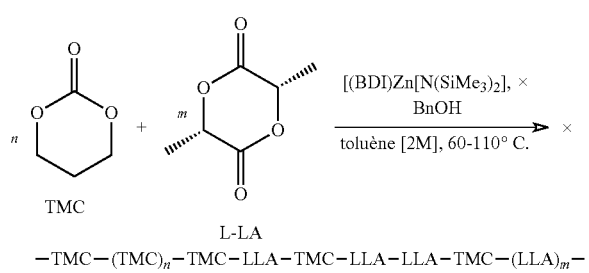

Scheme 4

The initial ratio [TMC]/[L-LA]/[Zn]/[BnOH] was fixed at 250/250/1/5. The reaction was stopped after a period of time ranging between 3 and 360 minutes. The results are displayed in Table 1.

TABLE 1

| Ex | T °C. | t min | Conv % TMC | Conv % L-LA | $Mn_{theo}^{a}$ g/mol | $Mn_{SEC}^{b}$ g/mol | Mw/Mn |
|---|---|---|---|---|---|---|---|
| 1 | 60 | 5 | 5 | 70 | 5400 | 4410 | 1.06 |
| 2 | 60 | 10 | 12 | 94 | 7490 | nd | nd |
| 3 | 60 | 30 | 16 | 100 | 8120 | nd | nd |
| 4 | 60 | 60 | 20 | 100 | 8330 | nd | nd |
| 5 | 60 | 360 | 38 | 100 | 9250 | 11750 | 1.10 |
| 6 | 110 | 3 | 24 | 82 | 7240 | 9520 | 1.09 |
| 7 | 110 | 8 | 89 | 85 | 10770 | 21200 | 1.41 |

$^{a}Mn_{theo}$ was calculated as $\{[TMC]/[BnOH] \times M_{TMC} \times conversion_{TMC} + ([L-LA]/[BnOH] \times M_{L-LA} \times conversion_{LLA}\} + M_{BnOH}$ with $M_{L-LA} = 144$ g/mol, $M_{TMC} = 102$ g/mol, $M_{BnOH} = 108$ g/mol.
$^{b}$determined by SEC (size exclusion chromatography) using polystyrene as reference with correction coefficients of 0.58 for PLLA and of 0.73 for PTMC.

These results show that, for a same ratio of TMC and L-LA, lactide was consumed much faster than the cyclic carbonate. The theoretical and experimental molecular weights were in good agreement and the molecular weight distribution defined as the ratio Mw/Mn of the weight average molecular weight Mw over the number average molecular weight Mn was quite narrow.

Figure 1:
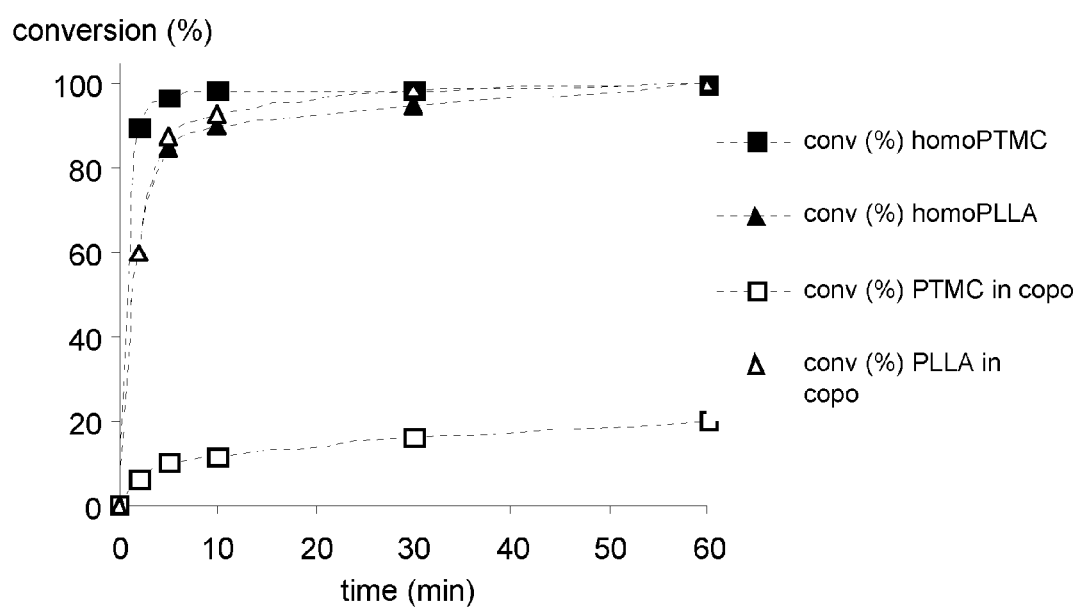
FIG. 1 represents the conversion of trimethylene carbonate (TMC) and lactide L-LA expressed in mol percent as a function of time expressed in minutes in homo- and in co-polymerisation in the presence of an organometallic catalyst system.

In homopolymerisation, both the lactide and cyclic carbonate exhibited a similar behaviour as seen in FIG. 1. The homopolymerisation reactions were carried out with the organometallic complex (BDI)Zn[N(SiMe₃)₂] in the presence of benzylic alcohol (BnOH), in toluene solution (2.0 M) and at a temperature of 60° C. The ratio [monomer]/[Zn]/[BnOH] was fixed at 250/1/5. The reaction was stopped after a period of time ranging between 2 and 60 minutes. The results are displayed in Table 2.

TABLE 2

| Ex | t (min) | Conv % TMC | Conv % LLA |
|---|---|---|---|
| 1 | 2 | 90 | 60 |
| 2 | 5 | 97 | 85 |
| 3 | 10 | 100 | 90 |
| 4 | 30 | 100 | 95 |
| 5 | 60 | 100 | 100 |

Monomers conversion was determined by ¹H NMR analysis

It can also be observed from FIG. 1 that the reaction rate of L-LA in copolymerisation was quite similar to that of homopolymerisation, whereas there is a significant difference between the reactivity of TMC when polymerised alone (homopolymerisation) or copolymerised in the presence of L-LA.

The presence of lactide inhibits the polymerisation of cyclic carbonate in the presence of an organometallic complex. Without wishing to be bound by a theory, it is believed that the lactide co-ordinates preferentially to the organometallic complex and is thus first polymerised. When lactide is fully consumed, the cyclic carbonate co-ordinates and starts polymerising. The resulting polymer is thus a true gradient di-block polymer.

Example 2

The percentage of TMC with respect to L-LA was varied between 2 and 20 weight %. Polymerisation was carried out in the presence of the organometallic complex (BDI)Zn[N(SiMe₃)₂] and of benzyl alcohol (BnOH), in toluene solution (2.0 M) and at a temperature of 110° C. The ratio [LLA]/[Zn]/[BnOH] was fixed at 1500/1/5. The reaction was stopped after a period of time ranging between 0.5 and 24 hours, ensuring that full conversion of the monomers was achieved. The results are displayed in Table 3.

TABLE 3

| Ex | t(h)$^a$ | Amount % TMC | Amount % L-LA | Mn$_{theo}$$^b$ g/mol | Mn$_{SEC}$$^c$ g/mol | Mw/Mn |
|---|---|---|---|---|---|---|
| 1 | 0.5 | 2 | 98 | 42390 | 52350 | 1.31 |
| 2 | 1.5 | 5 | 95 | 44730 | 49150 | 1.56 |
| 3 | 1.5 | 10 | 90 | 46300 | 55250 | 1.41 |
| 4 | 18 | 15 | 85 | 47800 | 41200 | 1.65 |
| 5 | 24 | 20 | 80 | 49320 | 36000 | 1.54 |

$^a$the reaction time corresponds to the time necessary for full conversion of each monomer.
$^b$Mn$_{theo}$ was calculated as {[TMC]/[BnOH] × M$_{TMC}$ × conversion$_{TMC}$ + ([L-LA]/[BnOH] × M$_{LLA}$ × conversion$_{LLA}$} + M$_{BnOH}$ with M$_{LLA}$ = 144 g/mol, M$_{TMC}$ = 102 g/mol, M$_{BnOH}$ = 108 g/mol.
$^c$determined by SEC (size exclusion chromatography) using polystyrene as reference with correction coefficients of 0.58 for PLLA and of 0.73 for PTMC.

It can be seen from table 3 that the molecular weight and molecular weight distribution were fully controlled.

Figure 2:
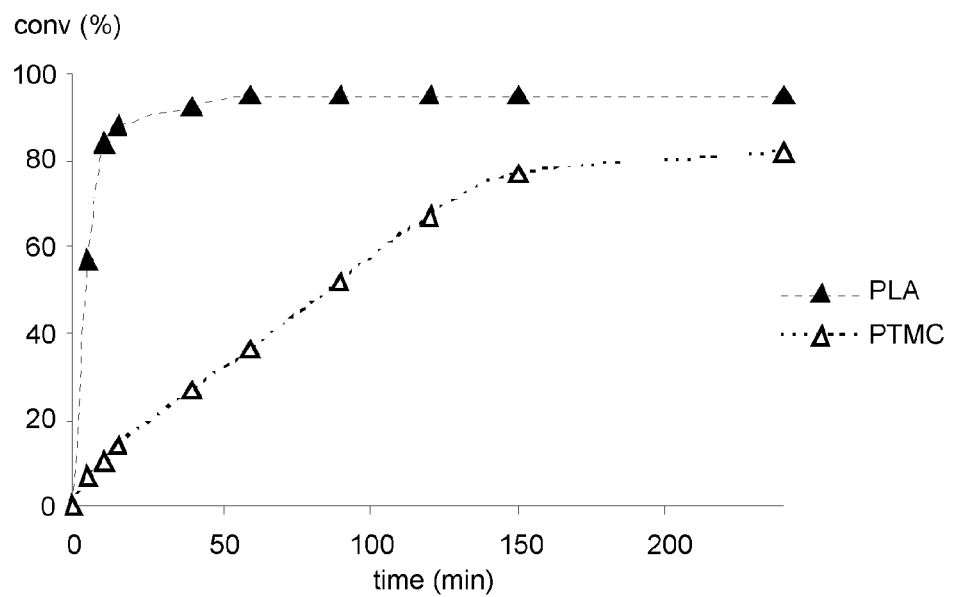
FIG. 2 represents the conversion of trimethylene carbonate (TMC) and lactide L-LA expressed in mol percent as a function of time expressed in minutes during their copolymerisation in the presence of the organometallic catalyst system [BDI]Zn(N(SiMe$_3$)$_2$)/BnOH with a ratio [TMC]/[L-LA]/Zn/BnOH of 250/250/1/5.

It can be seen in FIG. 2 that, for a ratio L-LA/TMC of 1/1, the polymerisation of L-LA was achieved in about 20 minutes whereas that of TMC took up to 4 hours.

The copolymers were characterised by NMR and SEC.

The monomer sequences present in the polymer have been determined by analysis of the $^1$H and $^{13}$C NMR chemical shifts following the method of Dobrzynski and Kasperczyk (Dobrzynski P., and Kasperczyk J. in *J. Polym. Sci. A: Polym. Chem.* 44, 2006, 3184).

The $^1$H NMR spectra of the copolymers showed the characteristic signals of a gradient di-block PTMC/PLLA polymer, as can be seen in FIGS. 3 and 3b is. The quadruplet at δ=5.20 ppm and the doublet at δ=1.60 ppm correspond to the PLLA block whereas the triplet at δ=4.20 ppm and the quadruplet at δ=2.05 ppm are associated with the PTMC block. Some additional peaks such as around δ=5.05 ppm and 1.5 ppm were attributed to random TMC units distributed within the PLLA block. These results were confirmed by the $^{13}$C NMR spectra as can be seen in FIG. 4. Two signals were associated with the lactide CO at δ=169.9 and 169.6 ppm and 2 signals were associated with the carbonate CO at δ=154.9 and 154.3 ppm. The signals at δ=169.9 and 154.3 ppm were associated with random insertions respectively of TMC in PLLA such as LTL, LLLT, TLLL and of LLA units in PTMC such as LTTTT, TTTTL, TLLT (T=TMC, L=LLA).

Size exclusion chromatography (SEC) confirmed the presence of PTMC/PLLA copolymer. A single monomodal peak was observed for all polymers as seen in FIG. 5.

The mechanical properties were studied by a traction test carried out following the method of standard test ASTMD 882 by a ZWICK (MEC125/2) with load cell 200 N at a cross-head speed of 10 mm/min. Small tensile bar were prepared by thermal compression moulding using 100 mg of the copolymer. Typically, the copolymer was heated up to 180-220° C. before injection into the mould offering tensile bar 17 mm long and 4 mm large. The results for the elastic modulus E, Young modulus Y, strain at rupture and elongation at break ε$_T$ are displayed in Table 4.

TABLE 4

| Ex | PLLA % | PTMC % | T (° C.) mat | T (° C.) mould | E (MPa) | E-F max (%) | Strain at rupture ε$_T$ (MPa) | (%) |
|---|---|---|---|---|---|---|---|---|
| 1 | 0 | 100 | 220 | 23 | 3 | 62 | 0.1 | 624 |
| 2 | 50 | 50 | 190 | 23 | 12 | 667 | 4 | 672 |
| 3 | 100 | 0 | 190 | 23 | 3192 | 7 | 68 | 7 |
| 4 | 98 | 2 | 185 | 23 | 3096 | 6 | 50 | 8 |
| 5 | 95 | 5 | 185 | 23 | 3336 | 6.8 | 51 | 8 |
| 6 | 90 | 10 | 185 | 23 | 3096 | 6.4 | 17 | 22 |
| 7 | 85 | 15 | 185 | 23 | 3065 | 1.6 | 20 | 1 |
| 8 | 80 | 20 | 185 | 23 | 3120 | 3.8 | 36 | 5 |

These results show that for a final ratio TMC/LLA of 50:50, the polymers exhibited a rubber-like behaviour with a low elastic modulus E and a very high elongation at break ε$_T$.

The elastomeric behaviour prevailed over the rigid behaviour. When the percentage of cyclic carbonate was increased from 2 to 25 mol %, the elongation at break increased and the elastic modulus remained high.

At percentages of carbonate up to 20 mol %, the elastic modulus and elongation at break were close to those of homopolymers of lactides with a high elastic modulus and a low elongation at break. It is believed that when the amount of carbonate is lower than 25 mol %, a fraction thereof is diverted in the polylactide block thereby leaving, in the polycarbonate block, less than the minimal amount necessary to observe changes in mechanical properties.

Copolymerisation of Cyclic Carbonates and Lactides with Lewis Acid Type Catalyst Systems.

The one-pot, one-step copolymerisation of TMC and L-LA was carried out with Al(OTf)$_3$ in toluene at a temperature of 110° C., in the presence of benzyl alcohol as transfer agent according to scheme 5.

Scheme 5

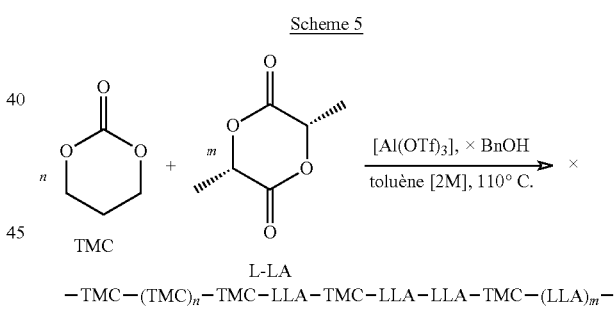

—TMC—(TMC)$_n$—TMC—LLA—TMC—LLA—LLA—TMC—(LLA)$_m$—

The ratio [TMC]/[LLA]/[Al]/[BnOH] was of 250/250/1/5. The polymerisation time was varied between 10 and 300 minutes and the conversion rates, obtained by $^1$H NMR are displayed in Table 5.

TABLE 5

| Ex | Time (min) | Conv. TMC (%) | Conv. L-LA (%) |
|---|---|---|---|
| 1 | 10 | 27 | 0 |
| 2 | 30 | 56 | 4 |
| 3 | 60 | 77 | 11 |
| 4 | 180 | 93 | 15 |
| 5 | 300 | 100 | 43 |

Monomers conversion were determined by $^1$H NMR analysis

The experiments were repeated with another Lewis acid type catalyst system based on Bi(OTf)$_3$. The results for both catalyst systems are reported in FIG. 6.

The polymerisation behaviour was completely different from that obtained in the presence of an organometallic complex catalyst system. Very surprisingly, the cyclic carbonate was consumed much faster than the lactide in the presence of a Lewis acid type catalyst system.

For comparison, the homopolymerisation of TMC and L-LA in toluene and at a temperature of 110° C. was studied as a function of time. The results are displayed in Table 6.

TABLE 6

| Ex | Time (min) | Conv TMC (%) | Conv. L-LA (%) |
|---|---|---|---|
| 1 | 10 | 18 | 8 |
| 2 | 30 | 48 | 23 |
| 3 | 60 | 70 | 42 |
| 4 | 180 | 98 | 83 |
| 5 | 300 | 100 | 100 |

Monomers conversion were determined by $^1$H NMR analysis

The homopolymerisation of cyclic carbonate TMC is much faster than that of lactide when carried out in the presence of a Lewis acid type catalyst system.

It was further observed from FIG. 7 that the activity of cyclic carbonates in homopolymerisation was very similar to their activity in copolymerisation in the presence of lactides. The reverse, however, was observed for lactides: their activity in copolymerisation with cyclic carbonates was much lower than their activity in homopolymerisation.

In the presence of metallic triflates, the operating mechanism is of the type 'activated monomer', which differs from that operating with the organometallic complexes which is of the type 'coordination-insertion'. In both cases, the resulting polymers are gradient di-blocks.

The polymers obtained with the system $Al(OTf)_3$ have been characterised by $^1$H and $^{13}$C NMR. The $^1$H NMR spectra were very similar to those observed for the polymers obtained with the organometallic catalyst system but it was not the case for the $^{13}$C NMR spectra as seen in FIG. 8. Three signals were observed for the lactide CO at δ=170.3, 169.9 and 169.6 ppm whereas only two signals at δ=169.9 and 169.6 ppm were observed for the organometallic system.

Copolymerisation of Cyclic Carbonates and Lactides with Organocatalyst Systems.

The one-pot, one-step copolymerisation of TMC and L-LA was carried out with 1,5,7-triazobicyclo-[4,4,0]dec-5-ene (TBD) in toluene at a temperature of 110° C., in the presence of benzylic alcohol as transfer agent according to scheme 6.

Scheme 6

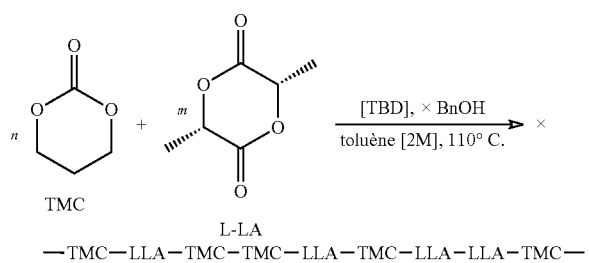

—TMC—LLA—TMC—TMC—LLA—TMC—LLA—LLA—TMC—

The ratio [TMC]/[LLA]/[Al]/[BnOH] was of 250/250/1/5. The polymerisation time was varied between 5 and 20 minutes and the conversion rates, obtained by $^1$H NMR, are displayed in Table 6.

TABLE 6

| Ex | Time (min) | Conv TMC (%) | Conv. L-LA (%) | $Mn_{theo}$ (g/mol) | $Mn_{SEC}$ (g/mol) | Mw/Mn |
|---|---|---|---|---|---|---|
| 1 | 5 | 79 | 78 | 9650 | 7250 | 1.37 |
| 2 | 10 | 90 | 86 | 10780 | 8690 | 1.47 |
| 3 | 20 | 100 | 100 | 12300 | 14100 | 1.51 |

The theoretical number average molecular weight Mn was calculated as previously using formula $Mn_{theo}=\{[TMC]/[BnOH]\times M_{TMC}\times conversion_{TMC}+[LLA]/[BnOH]\times M_{LLA}\times conversion_{LLA}\}+M_{BnOH}$, wherein $M_{TMC}$=102 g/mol, $M_{LLA}$×=144 g/mol and $M_{BnOH}$=108 g/mol.

The observed molecular weights were determined by size exclusion chromatography (SEC) using polystyrene as reference with correction coefficients respectively of 0.58 for PLA and 0.73 for PTMC.

The molecular weight distribution was determined by size exclusion chromatography.

In the presence of an organocatalyst, both lactide and cyclic carbonate TMC were consumed at the same rate. In copolymerisation, complete conversion of both monomers was observed fairly rapidly. In addition, the molecular weights were fully controlled as well as the molecular weight distributions.

The reaction rate of both monomers was also evaluated in homopolymerisation for comparison. The reactions were carried out with the same organocatalyst, TBD, at a temperature of 110° C. and with a ratio [monomer]/[catalyst]/alcohol=250/1/5. The results are displayed in Table 7 and in FIG. 9.

TABLE 7

| Ex | Tme (min) | Conv. TMC (%) | Conv. L-LA (%) |
|---|---|---|---|
| 1 | 5 | 97 | 100 |
| 2 | 10 | 100 | 100 |
| 3 | 20 | 100 | 100 |

Monomers conversion were determined by $^1$H NMR analysis

The reaction rates of cyclic carbonate TMC and lactide were very similar in homopolymerisation and conversion of both monomers was complete within a few minutes. These reaction rates seem somewhat higher in homopolymerisation than in copolymerisation for both monomers. The organocatalyst did not exhibit any preference for either monomer and the ring-opening polymerisation was equally carried out for the lactide as well as for the cyclic carbonate. The resulting polymers were random copolymers of TMC and L-LA.

They were characterised by $^1$H and $^{13}$C NMR as seen respectively in FIGS. 10 and 11. The $^{13}$C NMR spectrum of FIG. 11 was different from that obtained with organometallic catalyst systems or Lewis acid type catalyst systems. It showed 3 signals for the lactide CO respectively at δ=170.3, 169.9 and 169.6 ppm and also 3 signals for the cyclic carbonate CO respectively at δ=154.9, 154.3 and 154.1 ppm. It is believed that this results from the presence of random sequences of TMC and L-LA in the polymer structure.

The thermal properties of the copolymers were tested by differential scanning calorimetry (DSC). The results are displayed in FIG. 12. The glass transition temperature $T_g$ was observed at a temperature of 23° C., intermediate between the $T_g$ of PTMC at a temperature of −15° C. and that of PLLA at a temperature of 59° C. The observed melting temperature Tm of 147° C. was much lower than that of PLLA, typically of 175° C. This indicates that the copolymers obtained in the presence of an organocatalyst are random copolymers.

Determination of the Copolymers' Architecture by $^{13}$C NMR Spectroscopy.

The equations developed by Dobrzynski (Dobrzynski P., and Kasperczyk J. in *J. Polym. Sci.: Part A: Polym. Chem.*, 44, 3184-3201, 2006) were used to evaluate the block lengths by $^{13}$C NMR spectroscopy.

A 50:50 PTMC-co-PLLA copolymer was synthesised in one-pot, one-step by the system $(BDI)Zn[N(SiMe_3)_2]$/BnOH in toluene [2.0 M] at a temperature of 110° C. The resulting polymer had a number average molecular weight determined by GPC of 12500 g/mol. The $^{13}$C NMR spectrum is represented in FIG. 13, and the segment lengths were determined using equation $$I^e_T = \frac{[LT'T + TT''L] + [TTT] + [TT'L + LT''T] + [LT'L + LT''L]}{0,5([LT'T + TT''L] + [TT'L + LT''T]) + [LT'L + LT''L]}$$

$$I^e_{LL} = I^e_T \frac{F_{LL}}{1 - F_{LL}}$$

wherein [nnn] represents the intensity of the corresponding $^{13}$C NMR signal and $F_{LL}$ represents the molar fraction of lactide in the copolymer.

The segment lengths calculated for the carbonate and lactide were respectively of $I^e_T$=6.4 and $I^e_{LL}$=6.4.

Similar calculations were carried out for the other catalyst systems. The results are summarised in Table 8.

TABLE 8

| Catalyst | Proportion L-LA/TMC | $I^e_T$ | $I^e_{LL}$ |
|---|---|---|---|
| Al(OTf)$_3$ | 50:50 | 11.2 | 11.2 |
| Sc(OTf)$_3$ | 50:50 | 10.2 | 10.2 |
| Yb(OTf)$_3$ | 50:50 | 9.4 | 9.4 |
| Bi(OTf)$_3$ | 50:50 | 6.6 | 6.6 |
| (BDI)Zn[N(TMS)$_2$] | 50:50 | 6.4 | 6.4 |
| Zn(Et)$_2$ | 75:25 | 5.4 | 11.4 |
| TBD | 50:50 | 3.0 | 3.0 |

FIG. 14 represents the δ 150-175 ppm region of the $^{13}$C NMR spectrum (CDCl$_3$, 125 MHz, 23° C.) of copolymers obtained by the simultaneous copolymerisation of TMC and L-LA displayed in curves 1, 2 and 3 respectively for the TDB/BnOH, $(BDI)Zn[N(SiMe_3)_2]$/BnOH and Yb(OTf)$_3$/BnOH systems, and for the sequential copolymerisation of TMC and L-LA with the $(BDI)Zn[N(SiMe_3)_2]$/BnOH system displayed in curves 4 and 5 respectively for a number average molecular weight of 3000 and 23200 g/mol.

FIG. 15 represents the δ 60-75 ppm region of the $^{13}$C NMR spectrum(CDCl$_3$, 125 MHz, 23° C.) of copolymers obtained by the simultaneous copolymerisation of TMC and L-LA displayed in curves 1, 2 and 3 respectively for the TDB/BnOH, $(BDI)Zn[N(SiMe_3)_2]$/BnOH and Yb(OTf)$_3$/BnOH systems, and for the sequential copolymerisation of TMC and L-LA with the $(BDI)Zn[N(SiMe_3)_2]$/BnOH system displayed in curves 4 and 5 respectively for a number average molecular weight of 3000 and 23200 g/mol.

Table 9 summarises the properties of simultaneous and sequential copolymerisations.

TABLE 9

| Catalyst | Proportions L-LA/TMC | Mn$_{sec}$[a] (g·mol$^{-1}$) | Copo | $I^e_T$ | $I^e_{LL}$ |
|---|---|---|---|---|---|
| (BDI)Zn[N(TMS)$_2$] | 50:50 | 23 200 | Sequential | 85.3[b] | 93.8[b] |
| (BDI)Zn[N(TMS)$_2$] | 50:50 | 3 000 | Sequential | 11.7[b] | 9.5[b] |
| Yb(OTf)$_3$ | 50:50 | 10 500 | Simultaneous | 9.4 | 9.4 |
| (BDI)Zn[N(TMS)$_2$] | 50:50 | 12 500 | Simultaneous | 6.4 | 6.4 |
| TBD | 50:50 | 12 000 | Simultaneous | 3.0 | 3.0 |

[a]determined by SEC based on polystyrene reference with correction coefficients of 0.73 for PTMC and 0.58 for PLLA.
[b]values calculated with respect to SEC values and confirmed by $^1$H NMR.

It can be seen that the average segment lengths are shorter for the $(BDI)Zn[N(SiMe_3)_2]$/BnOH system than for the Yb(OTf)$_3$/BnOH system.

Also comparison between a true diblock prepared by sequential polymerisation of TMC and L-LA with the (BDI)Zn[N(SiMe$_3$)$_2$]/BnOH system and a gradient diblock prepared by the one-pot, one-step simultaneous polymerisation with the same catalyst system reveals that the monomers segment lengths are shorter for the simultaneous polymerisation than for the sequential polymerisation and therefore that the polymers have a different microstructure.

The invention claimed is:

1. A one-pot, one-step method for preparing a copolymer of lactide/cyclic carbonate comprising:
selecting a catalyst component from the group consisting of an organometallic component, a Lewis acidic metal salt component, and a metal-free organic component, so as to tailor a microstructure of the copolymer;
polymerizing by immortal ring-opening polymerization cyclic monomers in the presence of a catalyst system comprising the catalyst component and a protic source in molar excess to the catalyst component, acting as initiator and transfer agent, wherein comonomers, the catalyst component, and the protic source are placed simultaneously in the same reactor;
wherein the cyclic monomers comprise lactide (LA) and a cyclic carbonate, wherein the cyclic carbonate is a 5 or 7-membered cyclic carbonate or is a 6-membered cyclic carbonate selected from:

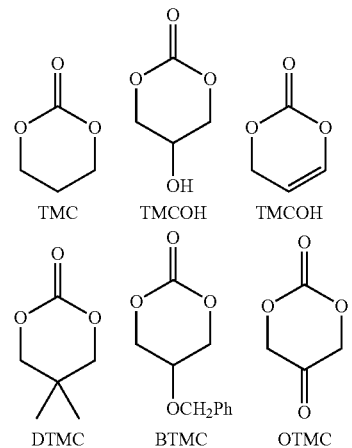

characterised in that the microstructure of the copolymer is determined by the catalyst system used such that when the catalyst component is the organometallic component the copolymer is a PLLA-grad-PTMC polymer, when the catalyst component is the Lewis acidic metal salt component the copolymer is a PTMC-grad-PLLA copolymer, and when the catalyst component is the metal-free organic component the copolymer is a statistical copolymer, wherein shorter average segment lengths are formed when the catalyst component is the organometallic component in comparison to when the catalyst component is the Lewis acidic metal salt component;

wherein the metal-free organic component is a dimeric phosphazene base, or an organic compound;

wherein the Lewis acidic metal salt is selected from complexes of formula $M(OSO_2CF_3)n$, or of formula $M(N(OSO_2CF_3)_2)_n$, or of formula $(R''CO_2)_nM$, wherein M is a metal Group 2, 3, 4, 12, 13, or 15 of the periodic table, including the lanthanide series, wherein each R is selected independently from a linear or branched hydrocarbyl radical having from 1 to 12 carbon atoms, substituted or not, wherein each R'' is selected independently from a perfluorinated alkyl or aryl residue having from 1 to 12 carbon atoms and wherein n is the valence of M;

wherein the organometallic component is selected from single-site catalyst components based upon a bulky β-diiminate ligands (BDI) of formula:

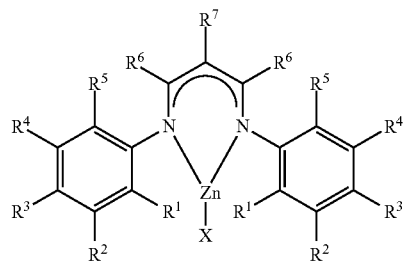

wherein $R^1$, $R^2$, $R^3$, $R^4$, $R^5$, $R^6$ and $R^7$ are each independently selected from hydrogen, unsubstituted or substituted hydrocarbyl, or inert functional group, wherein X is an hydrocarbyl radical having from 1 to 12 carbon atoms, an alkoxide group, an amido group or a borohydride group ($BH_4$).

2. The method of claim 1, wherein the catalyst component that is selected is the organometallic component.

3. The method of claim 1, wherein the catalyst component that is selected is the Lewis acidic metal salt.

4. The method of claim 1, wherein the catalyst component that is selected is the metal-free organic component.

5. A one-pot, one-step method for preparing a copolymer of lactide/cyclic carbonate comprising:
selecting a catalyst component from the group consisting of an organometallic component, a Lewis acidic metal salt component, and a metal-free organic component, so as to tailor a microstructure of the copolymer;
polymerizing by immortal ring-opening polymerization cyclic monomers in the presence of a catalyst system comprising the catalyst component and a protic source in molar excess to the catalyst component, acting as initiator and transfer agent, wherein comonomers, the catalyst component, and the protic source are placed simultaneously in the same reactor;
wherein the cyclic monomers comprise lactide (LA) and a carbonate monomer, wherein the carbonate monomer is a 5 or 7-membered cyclic carbonate or is a 6-membered cyclic carbonate selected from:

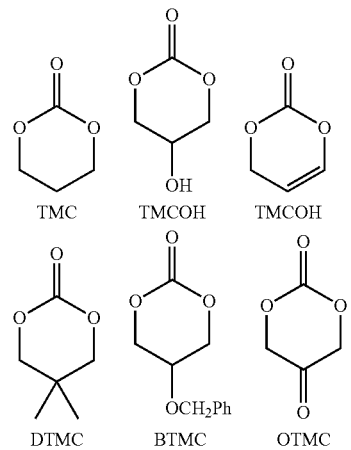

characterised in that the microstructure of the copolymer is determined by the catalyst system used such that when the catalyst component is the organometallic component the copolymer is a PLLA-grad-PTMC polymer, when the catalyst component is the Lewis acidic metal salt component the copolymer is a PTMC-grad-PLLA copolymer, and when the catalyst component is the metal-free organic component the copolymer is a statistical copolymer, wherein shorter average segment lengths are formed when the catalyst component is the organometallic component in comparison to when the catalyst component is the Lewis acidic metal salt component;

wherein the metal-free organic component is selected from selected from a phosphazene base, an amine, or a guanidine;

wherein the Lewis acidic metal salt is selected from complexes of formula $M(OSO_2CF_3)n$, or of formula $M(N(OSO_2CF_3)_2)_n$, or of formula $(R''CO_2)_nM$, wherein M is a metal Group 2, 3, 4, 12, 13, or 15 of the periodic table, including the lanthanide series, wherein each R is selected independently from a linear or branched hydrocarbyl radical having from 1 to 12 carbon atoms, substituted or not, wherein each R'' is selected independently from a perfluorinated alkyl or aryl residue having from 1 to 12 carbon atoms and wherein n is the valence of M;

wherein the organometallic component is selected from single-site catalyst components based upon a bulky β-diiminate ligands (BDI) of formula:

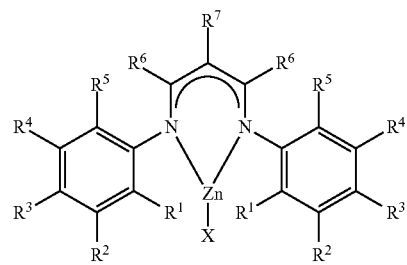

wherein $R^1$, $R^2$, $R^3$, $R^4$, $R^5$, $R^6$ and $R^7$ are each independently selected from hydrogen, unsubstituted or substituted hydrocarbyl, or inert functional group, wherein X is an hydrocarbyl radical having from 1 to 12 carbon atoms, an alkoxide group, an amido group or a borohydride group ($BH_4$); and wherein the protic source is an amine, or is an alcohol represented by formula R'OH wherein R' is an hydrocarbyl, linear or branched, having from 1 to 20 carbon atoms, or is 1,3-propanediol, trimethylolpropane or a higher functionality polyhydric alcohol.

6. The method of claim 5, comprising:
a) providing simultaneously and in the same reactor: the catalyst system, the protic source, and the cyclic monomers;
b) maintaining under polymerisation conditions at a temperature of from room temperature to 150° C. in bulk (melted monomer) or in a solvent;
c) retrieving the copolymer.

7. The method of claim 5, wherein the catalyst component that is selected is the organometallic component, and wherein the organometallic component is selected from [BDI]Zn(N(SiMe$_3$)$_2$), {[BDI]Zn(OiPr)}$_2$, and (BDI)Fe[N(SiMe$_3$)$_2$].

8. The method of claim 5, wherein all R are the same and are selected from $CH_3$ or $CF_3$ or wherein R" is selected from ($C_6F_5$) or ($CF_3$), or $CF_3(CF_2)m$ wherein m is an integer ranging between 1 and 6.

9. The method of claim 5, wherein the catalyst component that is selected is the Lewis acidic metal salt that is selected from Al(OTf)$_3$, Al(NTf$_2$)$_3$, Mg(OTf)$_2$, Ca(OTf)$_2$, Zn(OTf)$_2$, Sc(OTf)$_3$, Bi(OTf)$_3$, Al(OCOCF$_3$)$_3$, Zn(OCOCF$_3$)$_2$, Zn(BF$_4$)$_2$.

10. The method of claim 5, wherein the catalyst component that is selected is the metal-free organic component that is selected from dimeric phosphazene bases.

11. The method of claim 5, wherein the catalyst component that is selected is the metal-free organic component that is selected from 4-dimethylaminopyridine (DMAP) or 1,5,7-triazobicyclo-[4,4,0]dec-5-ene (TBD) or tert-butylimino-1,3dimethylperhydro-1,3,2diazaphosphine (BEMP).

12. The method of claim 5, wherein the protic source is an alcohol represented by formula R'OH wherein R' is an hydrocarbyl, linear or branched, having from 1 to 20 carbon atoms.

13. The method of claim 5, wherein the protic source is an alcohol, and wherein a molar ratio alcohol/catalyst component is at least 5.

14. The method of claim 5, wherein the protic source is an alcohol.

15. The method of claim 5, wherein the immortal ring-opening polymerization is carried out in bulk.

16. The method of claim 5, wherein the immortal ring-opening polymerization is carried out in solvent.

17. The method of claim 5, wherein at least 25 percent by mole of the copolymer is derived from the cyclic carbonate.

18. The method of claim 5, wherein the catalyst component that is selected is the organometallic component.

19. A one-pot, one-step method for preparing copolymers of lactide/cyclic carbonate by immortal ring-opening polymerization of cyclic monomers in the presence of a catalyst system comprising a catalyst component selected from an organometallic component, a Lewis acidic metal salt component, a metal-free organic component, or a combination thereof, and a protic source in molar excess to the catalyst component, acting as initiator and transfer agent, wherein comonomers, the catalyst component, and the protic source are placed simultaneously in the same reactor;

wherein the cyclic monomers comprise lactide (LA) and a carbonate monomer, wherein the carbonate monomer is a 5 or 7-membered cyclic carbonate or is a 6-membered cyclic carbonate selected from:

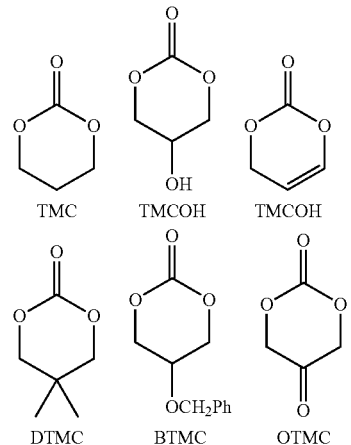

characterised in that a microstructure of the copolymer is determined by the catalyst system used such that when the catalyst component is the organometallic component the copolymer is a PLLA-grad-PTMC polymer, when the catalyst component is the Lewis acidic metal salt component the copolymer is a PTMC-grad-PLLA copolymer, and when the catalyst component is the metal-free organic component the copolymer is a statistical copolymer;

wherein the metal-free organic component is selected from selected from a phosphazene base, an amine, or a guanidine;

wherein the Lewis acidic metal salt is selected from complexes of formula $M(OSO_2CF_3)n$, or of formula $M(N(OSO_2CF_3)_2)_n$, or of formula $M(RC(O)CR_2C(O)R)_n$, or of formula $(R"CO_2)_nM$, wherein M is a metal Group 2, 3, 4, 12, 13, or 15 of the periodic table, including the lanthanide series, wherein each R is selected independently from a linear or branched hydrocarbyl radical having from 1 to 12 carbon atoms, substituted or not, wherein each R" is selected independently from a perfluorinated alkyl or aryl residue having from 1 to 12 carbon atoms and wherein n is the valence of M;

wherein the organometallic component is selected from single-site catalyst components based upon a bulky β-diiminate ligands (BDI) of formula:

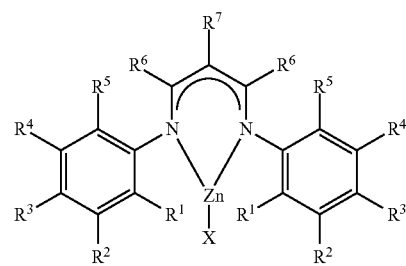

wherein $R^1$, $R^2$, $R^3$, $R^4$, $R^5$, $R^6$ and $R^7$ are each independently selected from hydrogen, unsubstituted or substituted hydrocarbyl, or inert functional group, wherein X is an hydrocarbyl radical having from 1 to 12 carbon atoms, an alkoxide group, an amido group or a borohydride group ($BH_4$); and wherein the protic source is an amine.

* * * * *